United States Patent
Cok et al.

(10) Patent No.: US 8,773,395 B2
(45) Date of Patent: Jul. 8, 2014

(54) TOUCH-RESPONSIVE CAPACITOR WITH POLARIZING DIELECTRIC METHOD

(75) Inventors: Ronald Steven Cok, Rochester, NY (US); Terrence Robert O'Toole, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 164 days.

(21) Appl. No.: 13/454,153

(22) Filed: Apr. 24, 2012

(65) Prior Publication Data

US 2013/0278545 A1    Oct. 24, 2013

(51) Int. Cl.
   *G09G 5/00*    (2006.01)
(52) U.S. Cl.
   USPC ........................................................ 345/174
(58) Field of Classification Search
   CPC .......... G06F 3/044; G06F 2203/04103; G06F 2203/04112
   USPC ................................................. 345/173, 174
   See application file for complete search history.

(56) References Cited

U.S. PATENT DOCUMENTS

| | | | |
|---|---|---|---|
| 3,223,525 A | 12/1965 | Jonker | |
| 6,395,863 B2 | 5/2002 | Geaghan | |
| 6,645,444 B2 | 11/2003 | Goldstein | |
| 6,707,450 B2 | 3/2004 | Ahn et al. | |
| 6,812,637 B2 | 11/2004 | Cok et al. | |
| 7,663,607 B2 | 2/2010 | Hotelling et al. | |
| 2006/0057502 A1 | 3/2006 | Okada et al. | |
| 2006/0262236 A1 | 11/2006 | Abileah | |
| 2008/0129189 A1 | 6/2008 | Cok | |
| 2008/0186288 A1 | 8/2008 | Chang | |
| 2009/0086113 A1* | 4/2009 | Ko et al. | 349/12 |
| 2009/0219258 A1* | 9/2009 | Geaghan et al. | 345/173 |
| 2010/0026664 A1 | 2/2010 | Geaghan | |
| 2010/0123672 A1 | 5/2010 | Kim | |
| 2011/0007011 A1 | 1/2011 | Mozdzyn | |
| 2011/0099805 A1 | 5/2011 | Lee | |
| 2011/0169767 A1 | 7/2011 | Weindorf et al. | |
| 2011/0187677 A1 | 8/2011 | Hotelling et al. | |
| 2011/0289771 A1 | 12/2011 | Kuriki | |
| 2012/0273336 A1* | 11/2012 | Kuriki | 200/600 |
| 2012/0312677 A1* | 12/2012 | Kuriki | 200/600 |
| 2013/0278544 A1* | 10/2013 | Cok | 345/174 |

* cited by examiner

*Primary Examiner* — Tom Sheng
(74) *Attorney, Agent, or Firm* — Raymond L. Owens

(57) ABSTRACT

A method of making a touch-responsive capacitive apparatus, includes providing a polarizing dielectric structure having a first surface and a second opposed surface, first and second conductive precursor material layers on the first and second surfaces, respectively; exposing the first conductive precursor material layer with first patterned polarized light having an orientation that is absorbed by the polarizing dielectric substrate so that the second conductive precursor material layer is not exposed; exposing the second conductive precursor material layer with second patterned polarized light having an orientation that is absorbed by the polarizing dielectric substrate so that the first conductive precursor material layer is not exposed; processing the exposed first conductive precursor material layer to form a first conductive material pattern on the first surface; and processing the exposed second conductive precursor material layer to form a second conductive material pattern on the second surface.

20 Claims, 24 Drawing Sheets

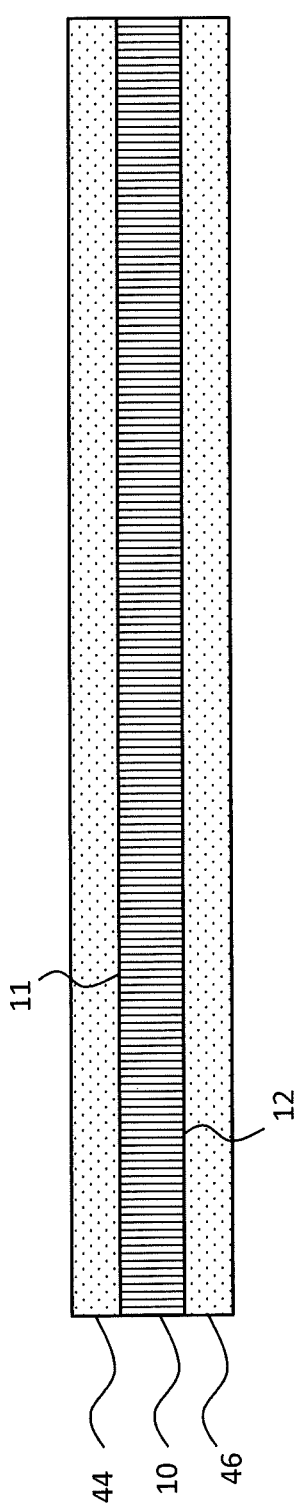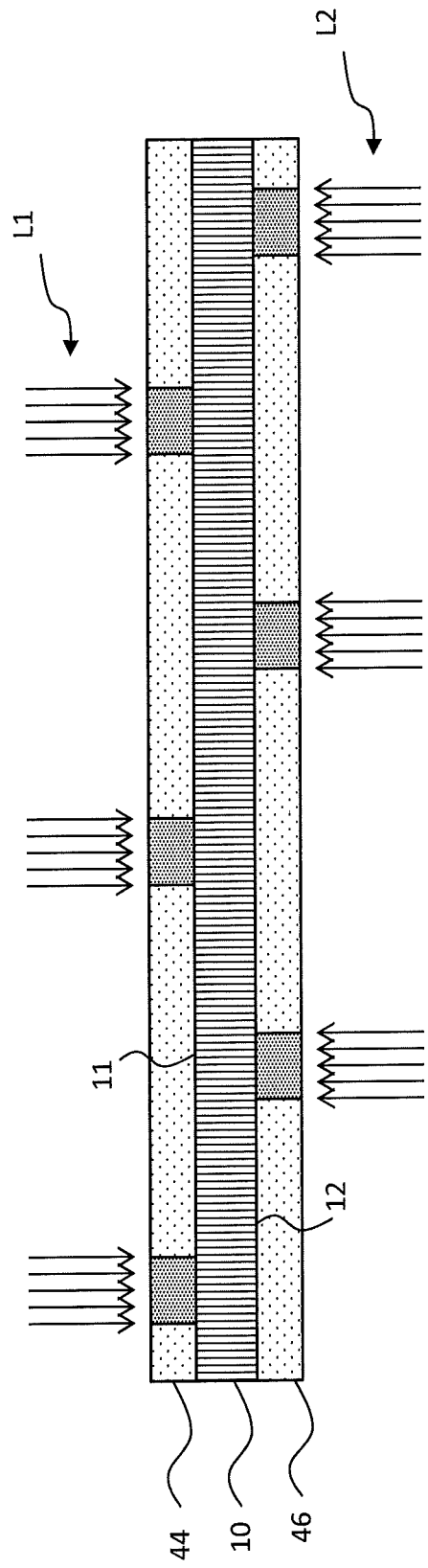

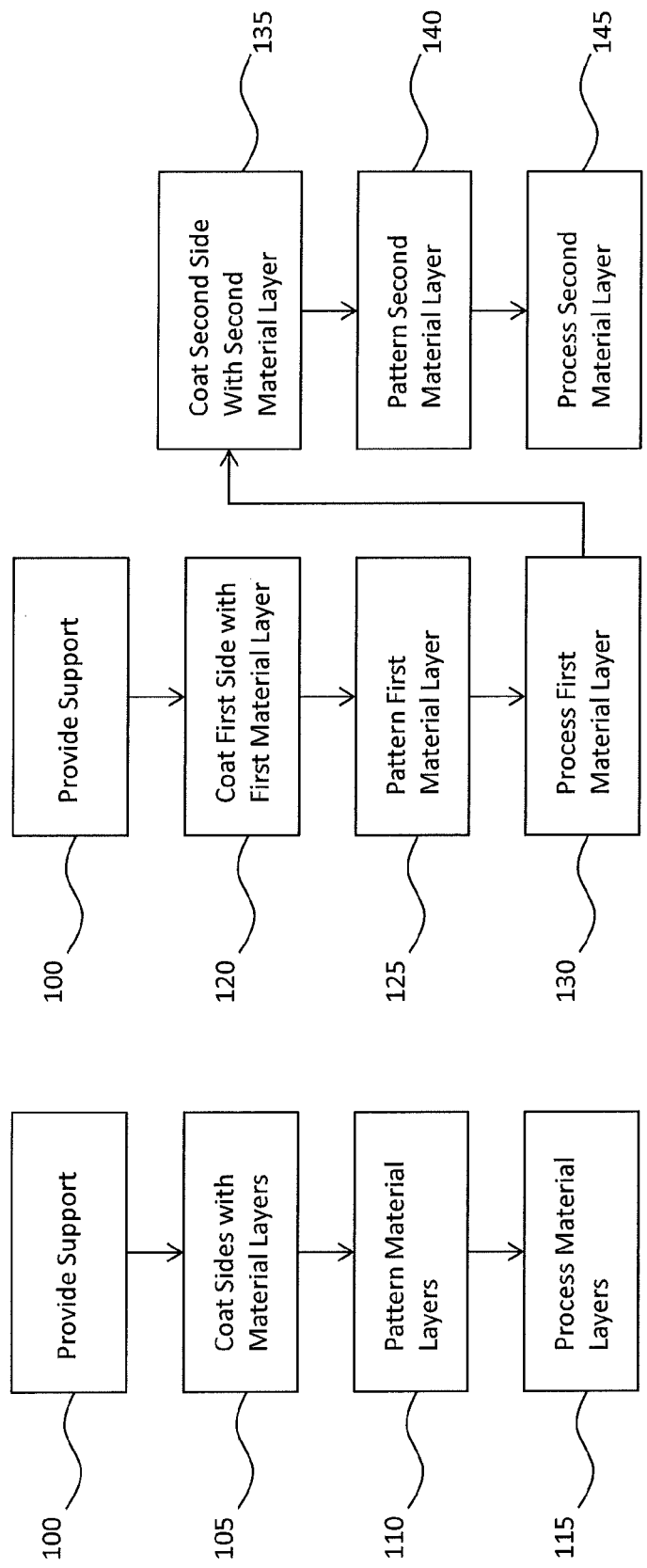

FIG. 20 – Prior Art

TOUCH-RESPONSIVE CAPACITOR WITH POLARIZING DIELECTRIC METHOD

CROSS REFERENCE TO RELATED INVENTIONS

Reference is made to commonly-assigned, co-pending U.S. patent application Ser. No. 13/454,145 filed Apr. 24, 2012, entitled Touch-responsive Capacitor with Polarizing Dielectric Structure, by Ronald S. Cok, the disclosure of which is incorporated herein.

Reference is made to commonly-assigned U.S. patent application Ser. No. 13/406,649, filed Feb. 28, 2012, entitled "Transparent Touch-Responsive Capacitor with Variable-pattern Micro-wires" by Ronald S. Cok, The disclosure of which is incorporated herein.

FIELD OF THE INVENTION

The present invention relates to capacitive touch-screen devices and their use in displays having polarizing light control.

BACKGROUND OF THE INVENTION

Transparent conductors are widely used in the flat-panel display industry to form electrodes that are used to electrically switch the light-emitting or light-transmitting properties of a display pixel, for example in liquid crystal or organic light-emitting diode displays. Transparent conductive electrodes are also used in touch-screens in conjunction with displays. In such applications, the transparency and conductivity of the transparent electrodes are important attributes. In general, it is desired that transparent conductors have a high transparency (for example, greater than 90% in the visible spectrum) and a high conductivity (for example, less than 10 ohms/square).

Typical prior-art conductive electrode materials include indium tin oxide (ITO) and very thin layers of metal, for example silver or aluminum or metal alloys including silver or aluminum. These materials are coated, for example by sputtering or vapor deposition, and patterned on display or touch-screen substrates, such as glass. However, the current-carrying capacity of such electrodes is limited, thereby limiting the amount of power that can be supplied to the pixel elements. Moreover, the substrate materials are limited by the electrode material deposition process (e.g. sputtering). Thicker layers of metal oxides or metals increase conductivity but reduce the transparency of the electrodes.

Various methods of improving the conductivity of transparent conductors are taught in the prior art. For example, issued U.S. Pat. No. 6,812,637 entitled "OLED Display with Auxiliary Electrode" by Cok, describes an auxiliary electrode to improve the conductivity of the transparent electrode and enhance the current distribution. Such auxiliary electrodes are typically provided in areas that do not block light emission, e.g., as part of a black-matrix structure.

It is also known in the prior art to form conductive traces using nano-particles comprising, for example silver. The synthesis of such metallic nano-crystals is known. For example, issued U.S. Pat. No. 6,645,444 entitled "Metal nano-crystals and synthesis thereof" describes a process for forming metal nano-crystals optionally doped or alloyed with other metals. U.S. Patent Application Publication No. 2006/0057502 entitled "Method of forming a conductive wiring pattern by laser irradiation and a conductive wiring pattern" describes fine wirings made by drying a coated metal dispersion colloid into a metal-suspension film on a substrate, pattern-wise irradiating the metal-suspension film with a laser beam to aggregate metal nano-particles into larger conductive grains, removing non-irradiated metal nano-particles, and forming metallic wiring patterns from the conductive grains. However, such wires are not transparent and thus the number and size of the wires limits the substrate transparency as the overall conductivity of the wires increases.

Touch-screens with transparent electrodes are widely used with electronic displays, especially for mobile electronic devices. Such prior-art devices typically include a touch-screen mounted over an electronic display that displays interactive information. Referring to FIG. 20, a display 310, for example prior-art liquid-crystal display 50 or organic light-emitting diode display 60 has a touch-screen 70 affixed to the surface of display 50, 60 through which light L is emitted or reflected. Numerous examples of displays with touch screens are known, for example U.S. Patent Publication No. 2011/0187677 discloses a liquid crystal display with an integrated touch-screen.

Referring to FIG. 21, a prior-art display and touch-screen system 300 using capacitive touch detection includes a display 310 with a corresponding touch screen 70 mounted with the display 310 so that information displayed on the display 310 can be viewed through the touch screen 70. Graphic elements displayed on the display 310 are selected, indicated, or manipulated by touching a corresponding location on the touch screen 70. The touch screen 70 includes a first transparent substrate 322 with first transparent electrodes 330 formed in the x-dimension on the first transparent substrate 322 and a second transparent substrate 326 with second transparent electrodes 332 formed in the y-dimension on the second transparent substrate 326 facing the x-dimension first transparent electrodes 330. A dielectric layer 324 is located between the first and second transparent substrates 322, 326 and first and second transparent electrodes 330, 332. The first and second pad areas 328, 329 are separated into different parallel planes by the dielectric layer 324. The first and second transparent electrodes 330, 332 have a variable width and extend in orthogonal directions (for example as shown in U.S. Patent Publication Nos. 2011/0289771 and 2011/0099805). When a voltage is applied across the first and second transparent electrodes 330, 332, electric fields are formed between the first pad areas 328 of the x-dimension first transparent electrodes 330 and the second pad areas 329 of the y-dimension second transparent electrodes 332.

A display controller 342 connected through electrical buss connections 336 controls the display 310 in coordination with a touch-screen controller 340. The touch-screen controller 340 is connected through electrical buss connections 336 and wires 334 and controls the touch screen 70. The touch-screen controller 340 detects touches on the touch screen 70 by sequentially electrically energizing and testing the x-dimension first and y-dimension second transparent electrodes 330, 332. Changes in capacitance between the x-dimension first and y-dimension second transparent electrodes 330, 332 can indicate a touch.

Since touch-screens 70 are largely transparent, any electrically conductive materials located in the transparent portion of the touch-screen 70 either employ transparent conductive materials (for example, transparent conductive metal oxides such as indium tin oxide) or employ conductive elements that are too small to be readily resolved by the eye of a touch-screen user. Transparent conductive metal oxides are well known in the display-and-touch-screen industry and have a number of disadvantages, including inadequate transparency and conductivity and a tendency to crack under mechanical or environmental stress. Thus, touch-screens including very fine patterns of conductive elements, such as metal wires or conductive traces are useful. For example, U.S. Patent Publication No. 2011/0007011 teaches a capacitive touch screen with a mesh electrode, as does U.S. Patent Publication No. 2010/0026664.

Referring to FIG. 22, a prior-art x- or y-dimension first or second variable-width transparent electrode 330, 332 includes a micro-pattern 356 of micro-wires 350 arranged in a rectangular grid. The micro-wires 350 are multiple very thin metal conductive traces or wires formed on the first and second transparent substrates 322, 326 to form the x- or y-dimension first or second transparent electrodes 330, 332. The micro-wires 350 are so thin that they are not readily visible to a human observer. The micro-wires 350 are typically opaque and spaced apart, so that the first or second transparent electrodes 330, 332 appear to be transparent and the micro-wires 350 are not distinguished by an observer. It is important that the micro-wires 350 are accurately located in the different layers and that the different micro-wire layers are aligned to enable efficient and consistent capacitance detection resulting from electrical field disturbances when the micro-wires 350 are energized.

Touch-screens 70 mounted over a display device 50, 60, 310, as shown in FIGS. 20, 21 are largely transparent so that a user can view displayed information through the touch-screen 70 and readily locate a point on the touch-screen 70 to touch and thereby indicate information associated with the touch. By physically touching, or nearly touching, the touch-screen 70 in a spatial touch-screen location associated with particular displayed information, a user can indicate an interest, selection, or desired manipulation of the associated particular information. The touch-screen 70 detects the touch and then electronically interacts with a computer-system processor (not shown) to indicate the touch location. The processor can then associate the touch location with displayed information to execute a programmed task associated with the information. For example, graphic elements in a computer-driven graphic user interface can be selected or manipulated with a touch-screen 70 mounted on a display 310 that displays the graphic user interface.

Touch-screens use a variety of technologies, including resistive, inductive, capacitive, acoustic, piezoelectric, and optical technologies. Such technologies and their application in combination with displays to provide interactive control of a processor and software program are well known in the art. Capacitive touch-screens are of at least two different types: self-capacitive and mutual capacitive. Self-capacitive touch-screens can employ an array of transparent electrodes, each of which in combination with a touching device (e.g. a finger or conductive stylus) forms a temporary capacitor whose capacitance can be detected. Mutual-capacitive touch-screens can employ an array of transparent electrode pairs that form capacitors whose capacitance is affected by a conductive touching device. In either case, each capacitor in the array can be tested to detect a touch and the physical location of the touch-detecting electrode in the touch-screen corresponds to the location of the touch. For example, U.S. Pat. No. 7,663,607 discloses a multipoint touch-screen having a transparent capacitive sensing medium configured to detect multiple touches or near touches that occur at the same time and at distinct locations in the plane of the touch panel and to produce distinct signals representative of the location of the touches on the plane of the touch panel for each of the multiple touches. The disclosure teaches both self- and mutual-capacitance touch-screens.

Polarizers are used in the optical sciences to control light transmission and orientation. Liquid crystal displays, for example, use polarizers to control the transmission or reflection of light in cooperation with electrically controllable liquid crystals. Organic light emitting diode (OLED) displays are known to use circular polarizers to reduce ambient reflection from the display as taught, for example, in U.S. Patent Publication No. 2008/0129189. It is important to reduce the number of layers and elements in display systems including displays, touch-screens, and light-control layers such as polarizers in order to reduce unwanted reflection, for example of ambient light. It is also important to reduce weight and thereby enhance portability and to reduce cost of such display systems.

The use of polarizing layers in conjunction with liquid crystal displays is known in the art, for example in U.S. Patent Publication No. 2011/0169767, U.S. Pat. No. 6,395,863, U.S. Pat. No. 6,707,450, and U.S. Patent Publication No. 2006/0262236. These various references describe polarizing layers either above or below a touch screen and affixed to the viewing side of a liquid crystal display to improve the contrast of the display in the presence of ambient illumination. U.S. Patent Publication No. 2010/0123672 describes a polarizer above a resistive touch screen together with an OLED display. However, such designs add additional weight, thickness, and cost to a display system.

There is a need, therefore, for an improved method and apparatus for providing touch response and light control for touch-screen display systems.

SUMMARY OF THE INVENTION

In accordance with the present invention, a method of making a touch-responsive capacitive apparatus comprises:

providing a polarizing dielectric structure having a first surface and a second surface opposed to the first surface, a first conductive precursor material layer on the first surface, and a second conductive precursor material layer on the second surface;

exposing the first conductive precursor material layer with first patterned polarized light, the first patterned polarized light having an orientation that is absorbed by the polarizing dielectric substrate so that the second conductive precursor material layer is not exposed;

exposing the second conductive precursor material layer with second patterned polarized light, the second patterned polarized light having an orientation that is absorbed by the polarizing dielectric substrate so that the first conductive precursor material layer is not exposed;

processing the exposed first conductive precursor material layer to form a first conductive material pattern on the first surface; and processing the exposed second conductive precursor material layer to form a second conductive material pattern on the second surface.

The present invention provides an improved integrated apparatus and manufacturing process with reduced tolerances and costs for display devices including transparent micro-wire electrodes in a mutually capacitive touch-screen without deleteriously affecting the operation of the apparatus.

These, and other, attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. For example, the summary descriptions above are not meant to describe individual separate embodiments whose elements are not interchangeable. Many of the elements described as related to a particular embodiment can be used together with, and interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIGS. 10A-10C are sequential cross sections illustrating a method of the present invention;

FIG. 12 is a flow diagram illustrating a method of the present invention;

FIG. 13 is a flow diagram illustrating another method of the present invention;

The Figures are not drawn to scale, since the various elements of the Figures have too great a size variation to permit depiction to scale.

DETAILED DESCRIPTION OF THE INVENTION

Figure 1:
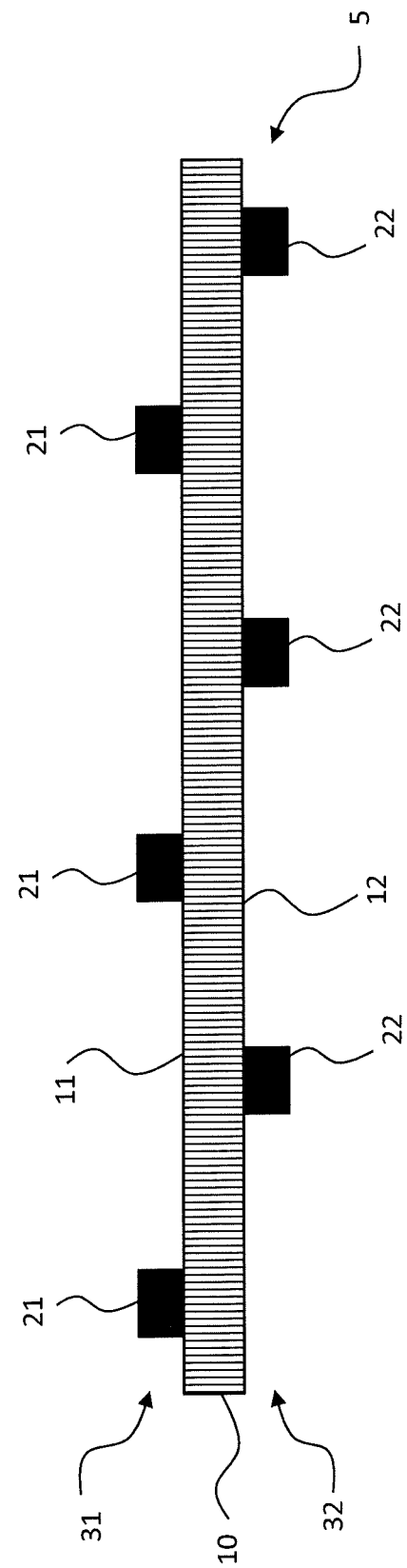
FIG. 1 is a cross section illustrating an embodiment of the present invention.

Referring to FIG. 1, in an embodiment of the present invention a touch-responsive capacitive apparatus 5 includes means for defining first and second surfaces 11, 12. A first micro-wire layer 31 is formed on the first surface 11 and a second micro-wire layer 32 is formed on the second surface 12. The first micro-wire layer 31 includes a plurality of electrically connected first micro-wires 21 and the second micro-wire layer 32 includes a plurality of electrically connected second micro-wires 22. A polarizing dielectric structure 10 is located between the first and second micro-wire layers 31, 32. The micro-wire layers 31, 32 are formed on first and second surfaces 11, 12, respectively. In various embodiments, the polarizing dielectric structure 10 is a substrate, support, or layer, or can include multiple layers, supports, or substrates.

In various embodiments of the present invention, the first and second surfaces 11, 12 are surfaces of one or more substrates, supports, or other objects having extended surface areas suitable for forming micro-wire layers. The substrate can have one or more layers formed thereon providing the first and second surfaces 11, 12 with desirable surface characteristics such as mechanical stability, smoothness, impermeability, hardness, strength, resistance to environmental contaminants (e.g. liquids or gases), flexibility or rigidity, hydrophobic or hydrophilic properties, or resistance to high or low temperatures, or temperature fluctuations. The substrates can be transparent, for example more than 50% transparent to visible light or to light having a wavelength of 550 nm or, more preferably, more than or equal to 80% transparent to visible light or to light having a wavelength of 550 nm. In an embodiment in which a substrate is a polarizer, for example a linear polarizer, the substrate can have a transparency of 30% to 50%, or more particularly from 38% to 45%.

As illustrated in the embodiment of FIG. 1, the first and second surfaces 11, 12 are the opposing and substantially parallel sides of the polarizing dielectric structure 10. Hence, in this embodiment, only one substrate is used.

Figure 2:
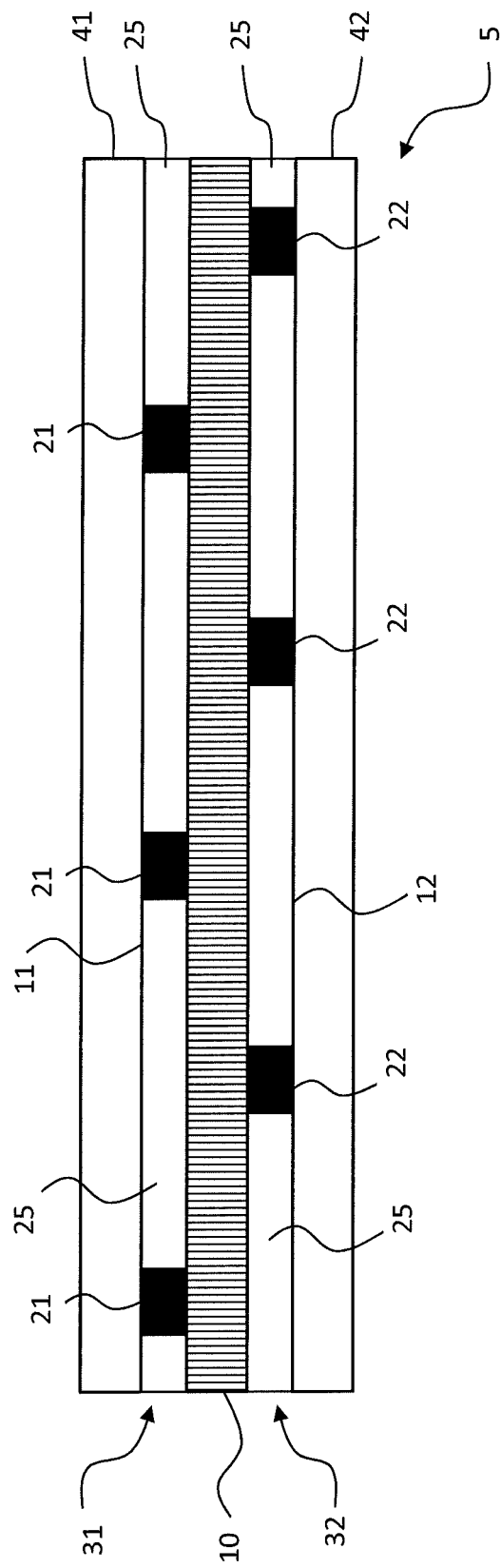
FIG. 2 is a cross section illustrating another embodiment of the present invention.

Referring to FIG. 2, an alternative embodiment of a touch-responsive capacitive apparatus 5 has three substrates: a first substrate 41 providing first surface 11, a second substrate 42 providing second surface 12, and a third substrate that is the polarizing dielectric structure 10 located between the first substrate 41 and the second substrate 42. The first micro-wire layer 31 is located on the first surface 11 between the first substrate 41 and the polarizing dielectric structure 10. The first micro-wires 21 of the first micro-wire layer 31 can be in contact with the first substrate 41 (or layers formed on the first substrate 41) and the polarizing dielectric structure 10 (or layers formed on the polarizing dielectric structure 10). Likewise, the second micro-wire layer 32 is located on the second surface 12 between the second substrate 42 and the polarizing dielectric structure 10. The second micro-wires 22 of the second micro-wire layer 32 can be in contact with the second substrate 42 (or layers formed on the second substrate 42) and the polarizing dielectric structure 10 (or layers formed on the polarizing dielectric structure 10). Any spaces between the first or second substrates 41, 42 and the polarizing dielectric structure 10 that are not first or second micro-wires 21, 22 can be filled with a transparent material 25, for example a non-conducting polymeric material that can be index matched to other layers, for example adjacent layers such as the first or second substrates 41, 42 or layers in the polarizing dielectric structure 10. Referring again to FIG. 2, material 25 is located between first substrate 41 and the polarizing dielectric layer 10 interspersed between the first micro-wires 21. Material 25 is also located between second substrate 42 and the polarizing dielectric layer 10 interspersed between the micro-wires 22. The transparent material 25 does not necessarily have an optical function but enables a solid-state structure for the touch-responsive capacitive apparatus 5. For clarity, the transparent material 25 is omitted from the other figures but can be included according to the various embodiments of the present invention illustrated in the Figures. Thus, the first and second micro-wire layers 31, 32 can each include transparent material 25 and provide a solid-state layer, or not as desired.

Figure 3:
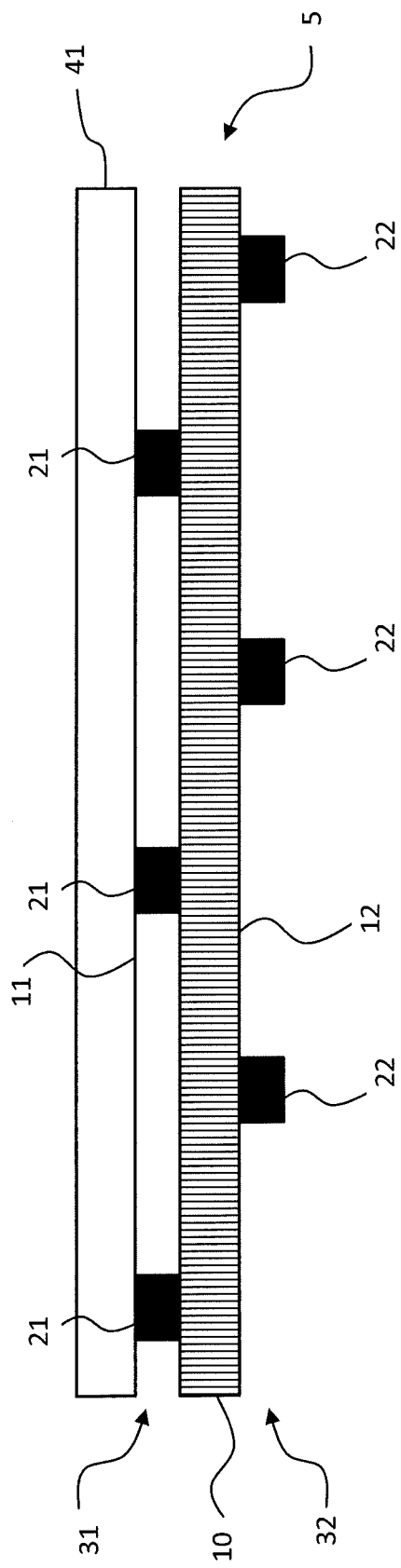
FIG. 3 is a cross section illustrating an alternative embodiment of the present invention.

Another embodiment of a touch-responsive capacitive apparatus 5 shown in FIG. 3 has two substrates: a first substrate 41 providing first surface 11, and a second substrate 42 (not shown) that is the polarizing dielectric structure 10 providing the second surface 12. The first micro-wire layer 31 is located on the first surface 11 between the first substrate 41 and the polarizing dielectric structure 10. The first micro-wires 21 of the first micro-wire layer 31 can be in contact with the first substrate 41 (or layers formed on the first substrate 41) and the polarizing dielectric structure 10 (or layers formed on the polarizing dielectric structure 10). The second micro-wires 22 of the second micro-wire layer 32 are formed on the polarizing dielectric structure 10 (or layers formed on the polarizing dielectric structure 10) on the second surface 12 of the polarizing dielectric structure 10 opposite the first micro-wire layer 31. The embodiments of FIGS. 2 and 3 can also be constructed by forming either of the first or second micro-wire layers 31, 32 on the polarizing dielectric structure 10 as shown in FIG. 1 and locating the first or second substrate 41, 42 as shown in FIG. 2 or 3.

In one embodiment of the present invention, the polarizing dielectric structure 10 is a linear polarizer. Polarizing structures are known in the art, for example, films including polyvinyl alcohol laminated between layers of tri-acetate cellulose film. In further embodiments of the present invention, either of the first or second surfaces 11, 12 is a substrate surface separate from the polarizing dielectric structure 10 (as shown in FIG. 2) or either of the first or second surfaces 11, 12 is a surface of a linear polarizer or of a quarter-wave plate (not shown in FIG. 3) or, referring to FIG. 4, either of the first or second surfaces 11, 12 is a surface of a quarter-wave plate 14. The quarter-wave plate 14 can be a layer applied to a linear polarizer 16 as part of the polarizing dielectric structure 10. Quarter-wave plates 14, also known as optical retarders, are optical devices known in the prior art that alter the polarization state of light travelling through the plate. In an embodiment, the polarizing dielectric substrate 10 is a circular polarizer 15.

Figure 4:
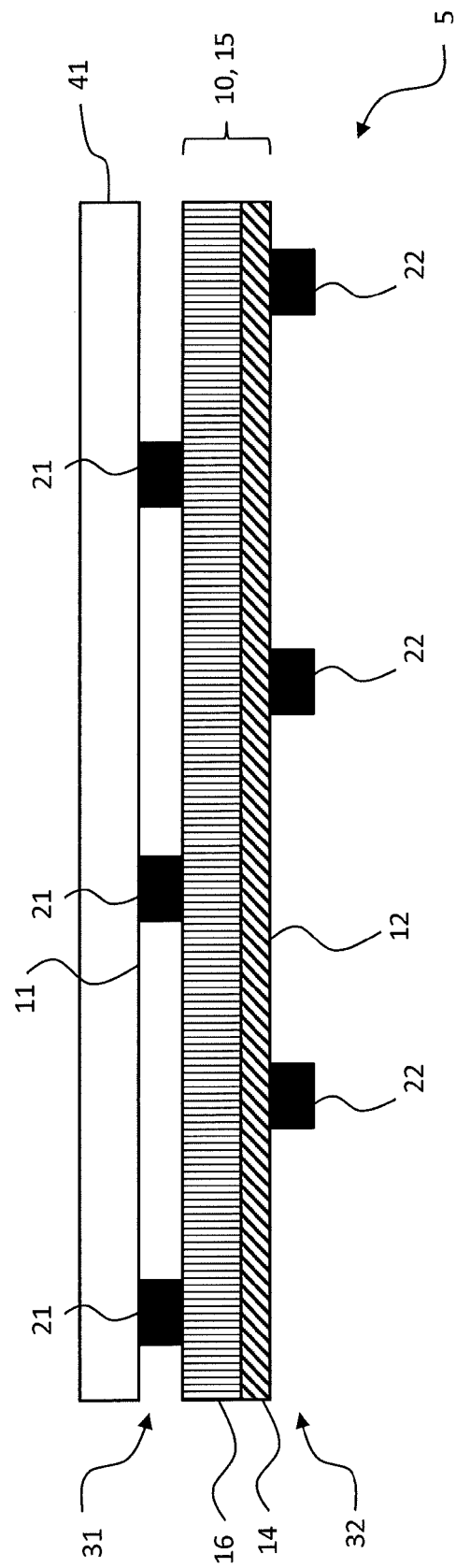
FIG. 4 is a cross section with a circular polarizer illustrating an alternative embodiment of the present invention.

In the embodiment of a touch-responsive capacitive apparatus 5 as shown in FIG. 4, the second micro-wire layer 32 includes second micro-wires 22 formed on the quarter-wave plate 14 opposite the linear polarizer 16. Second surface 12 is a surface of the quarter-wave plate 14. The quarter-wave plate 14 in combination with the linear polarizer 16 forms a circular polarizer 15 that serves as the polarizing dielectric structure 10. First surface 11 is a surface of either the linear polarizer 16 or the first substrate 41. First micro-wire layer 31 includes micro-wires 21 located between the linear polarizer 16 opposite the quarter-wave plate 14 and the first substrate 41.

Figure 19:
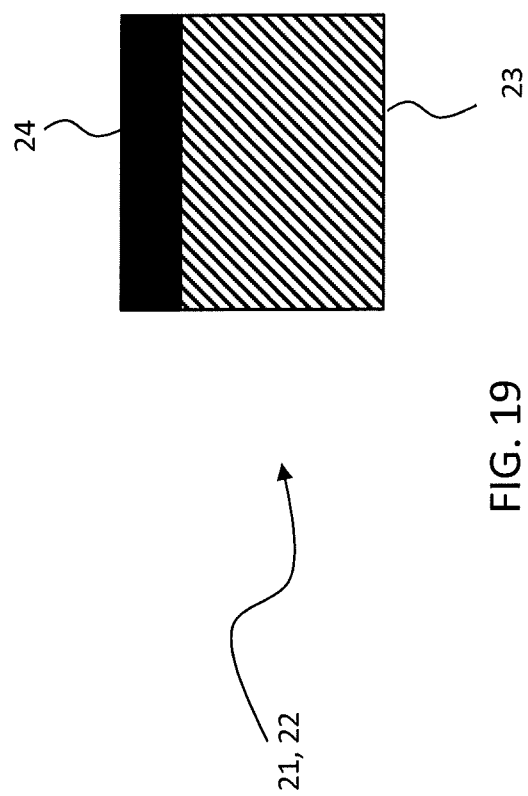
FIG. 19 is a cross section of a micro-wire useful in the present invention.
Figure 20:
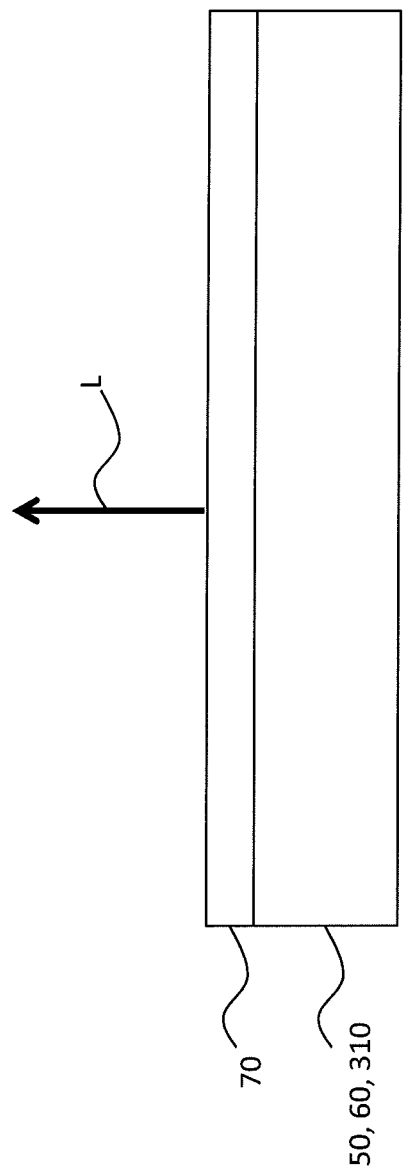
FIG. 20 is cross section illustrating a display with a touch-screen according to the prior art.

In various embodiments of the present invention, first micro-wires 21 or second micro-wires 22 are a metal, a metal alloy, carbon, or a material including cured or sintered metal particles, for example nickel, tungsten, silver, gold, aluminum, copper, nickel, titanium, or tin, or combinations thereof. Conductive materials are preferred. In an embodiment of the present invention, the first or second micro-wires 21, 22 absorb light, such as ambient light or light emitted from a device such as a display device. For example, the first or second micro-wires 21, 22 are composed of a light-absorbing material, such as some forms of silver, aluminum, or carbon. Alternatively, referring to FIG. 19, the first or second micro-wires 21, 22 can include multiple elements, a conductive material 23 such as a metal (e.g. silver, aluminum, gold, or copper) and a light-absorbing layer 24 located over, under, or around the conductive material 23. Suitable light-absorbing materials for the light-absorbing layer 24 can include carbon black, oxidized metals, or pigments. The light-absorbing layer 24 can be a metal coating or layer, or a plastic or resin that includes dyes or pigments.

In a useful embodiment of the present invention, the first and second micro-wires 21, 22 are too small to be readily seen by the unaided eye of a human observer. For example, the first micro-wires 21 or the second micro-wires 22 each have a width in a range of 0.5 um to 20 um and occupy an area less than 15% of the area of the first micro-wire layer 31 or the second micro-wire layer 32, respectively.

The first micro-wires 21 in the first micro-wire layer 31 are electrically connected, for example in a first grid, forming a single first electrical conductor. Likewise, the second micro-wires 22 in the second micro-wire layer 32 are electrically connected, for example in a second grid, forming a single second electrical conductor. The first and second electrical conductors are not electrically connected. The first and second grids can be aligned, so that if viewed orthogonally to the first or second surfaces 11, 12, only one grid is perceived. Alternatively, the first and second grids can be offset, so that if viewed orthogonally to the first or second surfaces 11, 12, two overlapping grids are perceived.

Figure 5:
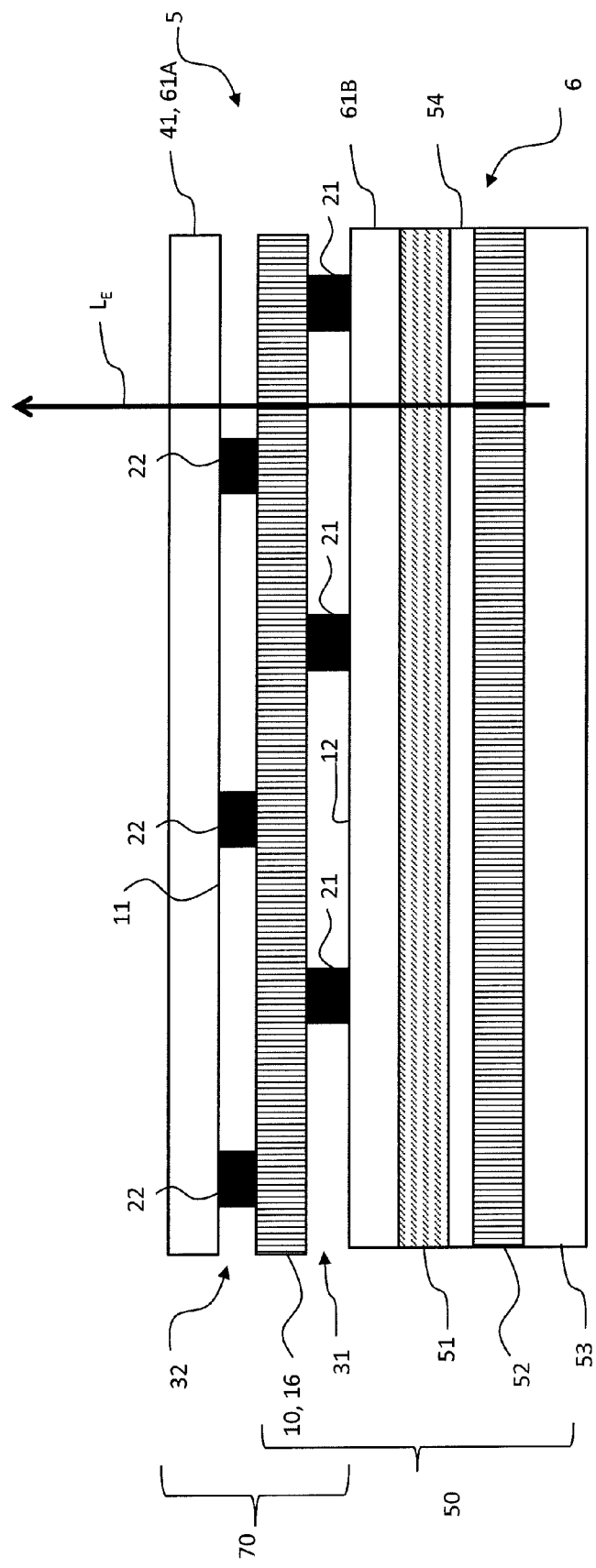
FIG. 5 is a cross section illustrating an LCD display and touch-screen according to an embodiment of the present invention.
Figure 21:
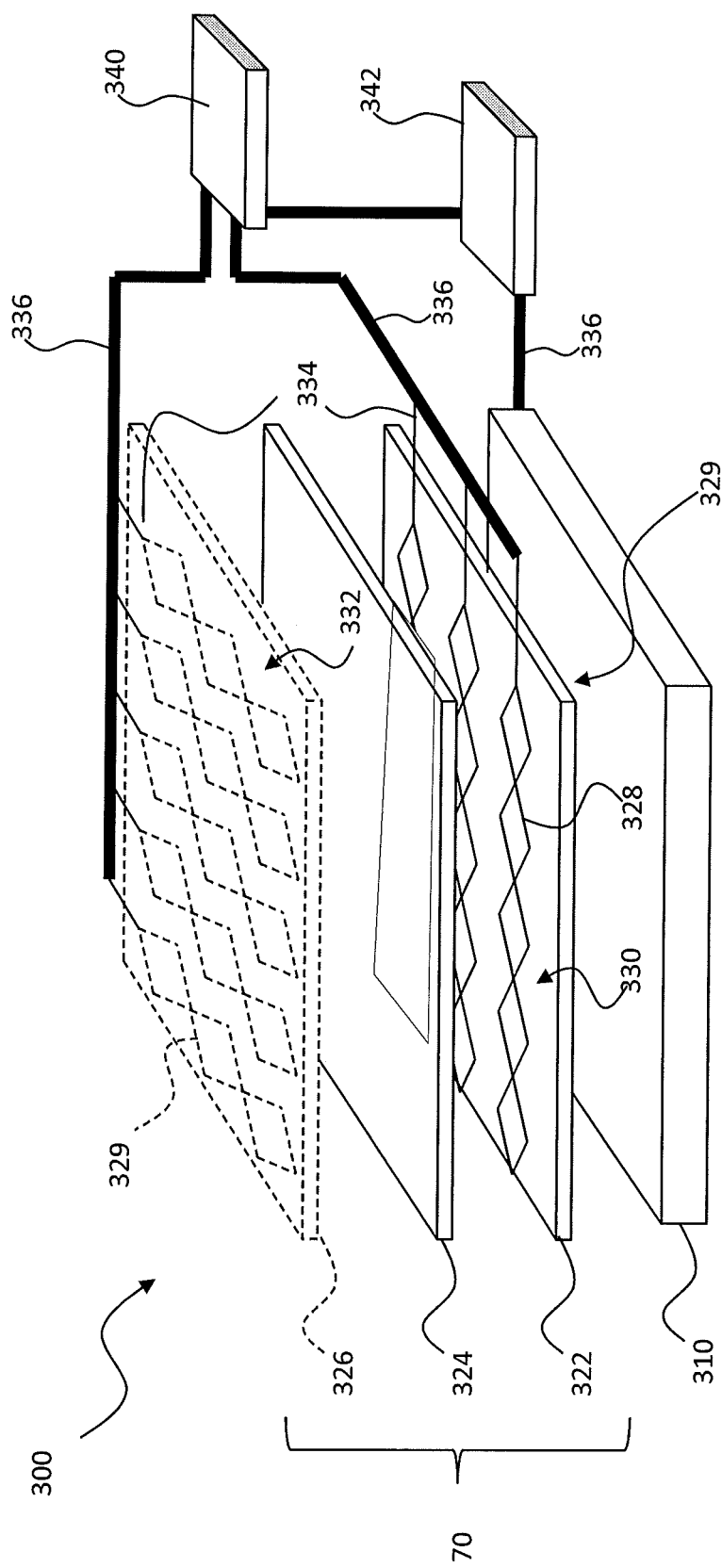
FIG. 21 is an exploded perspective illustrating a prior-art mutual capacitive touch screen having overlapping pad areas in conjunction with a display and controllers.
Figure 22:
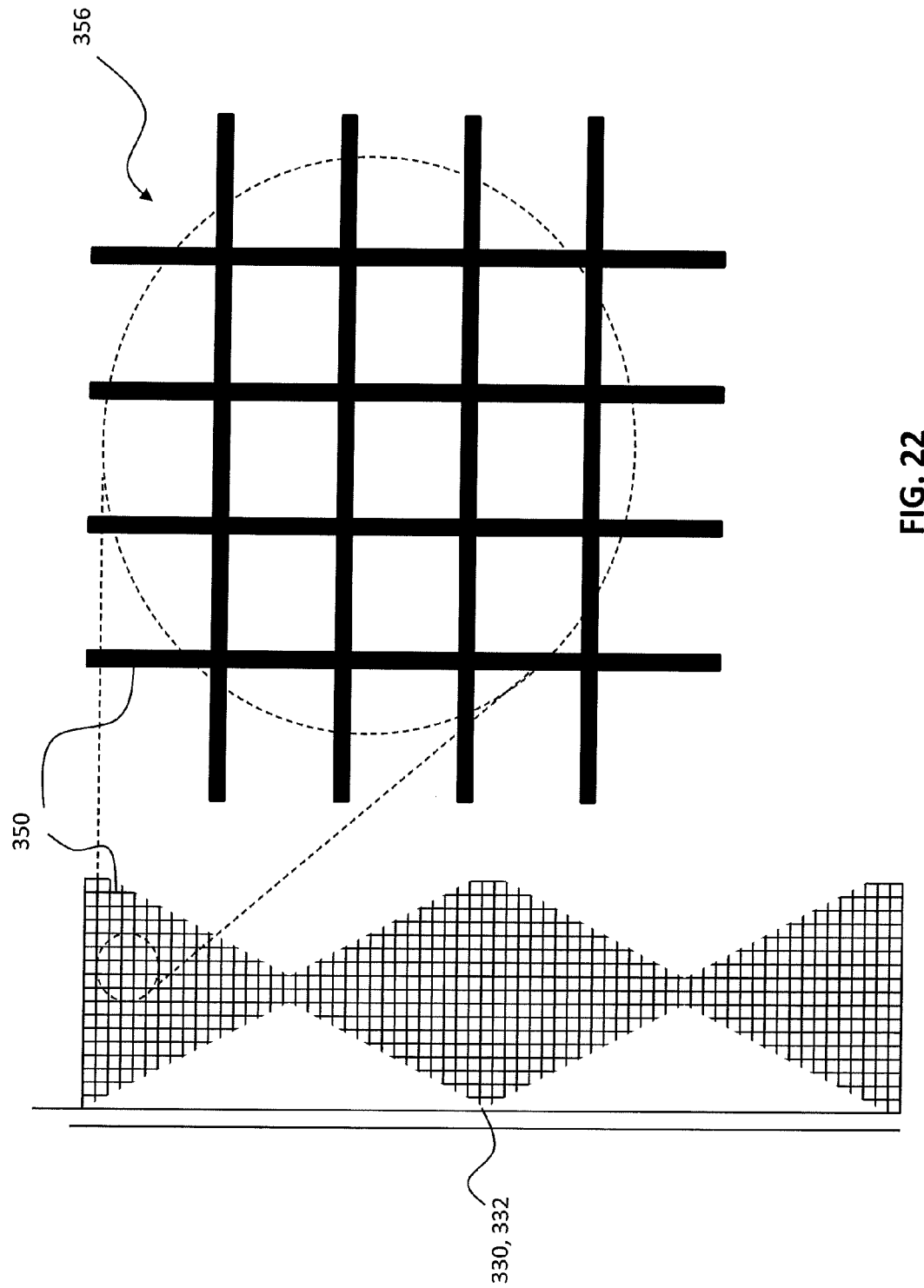
FIG. 22 is a schematic illustrating prior-art micro-wires in an apparently transparent electrode.

The present invention is useful in forming a touch-responsive capacitive apparatus 5 in cooperation with a display 310. FIG. 5 illustrates the addition of a liquid-crystal display 50 to the structure illustrated in FIG. 3. Referring to FIG. 5, the liquid-crystal display 50 includes a backlight 53 for emitting spatially uniform light $L_E$ over at least a portion of the extent of the display 50, for example including lighting elements such as light-emitting diodes and light-diffusive and light-collimating layers. Such backlights are known in the display arts. A polarizer layer 52 polarizes the backlight-emitted light $L_E$. The light then passes through a liquid crystal layer 51 that locally rotates the polarization of the light at each pixel location in response to display controller signals (e.g. display controller 342 in FIG. 21, not shown in FIG. 5) providing an electric field formed by electrodes controlled by electronics (e.g. thin-film transistors) in electronic and electrode layer 54 and opposing electrodes (not shown), for example on the display cover 61B. According to an embodiment of the present invention, a second linear display polarizing layer 16 is the polarizing dielectric structure 10 and is arranged so that the polarization direction of layer 52 is orthogonal to the polarization direction of the polarizing dielectric structure 10. Emitted light $L_E$ that is not rotated by the liquid crystal layer 51 will be absorbed by the polarizing dielectric structure 10. Emitted light $L_E$ that is rotated by the liquid crystal layer 51 will pass through the polarizing dielectric structure 10. The variation in emitted light $L_B$ across the extent of the display caused by the display controller provides the display information, for example graphics, text, or images.

The first and second micro-wire layers 31, 32 having first and second micro-wires 21, 22 are located on the first surface 11 of first substrate 41 and the second surface 12 of cover 61B or, in an alternative embodiment, the polarizing dielectric structure 10. The first and second micro-wires 21, 22 are separated by the polarizing dielectric structure 10 to form a touch-responsive capacitive apparatus 5. The first substrate 41 is useful to provide a protective layer (e.g. a cover 61A) or to form a surface on which other layers (e.g. anti-reflective layers) can be formed.

The first and second micro-wires 21, 22 can be electrically energized by a touch-screen controller (e.g. 340 in FIG. 21) to form an electric field that extends through the first substrate 41. A conductive object (e.g. a finger) touching the first substrate 41 disturbs the electric field and the capacitance of the first and second micro-wires 21, 22. This change in capacitance is detected by the touch-screen controller (e.g. display controller 342 in FIG. 21, not shown in FIG. 5).

By functionally integrating the polarizing dielectric structure 10 into both the liquid crystal display 50 and the touch screen 70 to form a touch-responsive display apparatus 6 according to an embodiment of the present invention, fewer layers are required with a consequent savings in system thickness, materials cost, and assembly cost.

Referring to FIGS. 6-9, in another embodiment of the present invention, an organic light-emitting diode display 60 is integrated with a touch-responsive capacitive apparatus 5 to provide a touch-responsive display apparatus 6. The arrangement of FIG. 6 corresponds to the structure shown in FIG. 4, including a first substrate 41 with a first surface 11 on which are located first micro-wires 21 forming a first micro-wire layer 31. A linear polarizer 16 and quarter-wave plate 14 form circular polarizer 15 and polarizing dielectric structure 10. The quarter-wave plate 14 provides the second surface 12 on which are located the second micro-wires 22 of second micro-wire layer 32.

Figure 7:
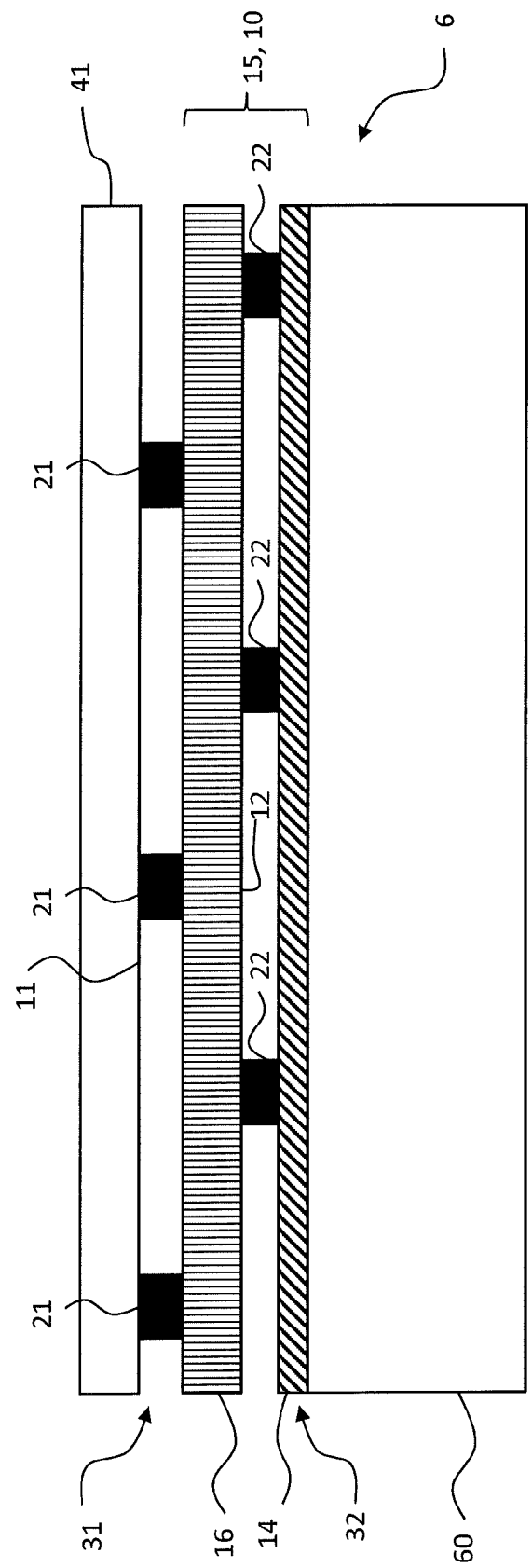
FIG. 7 is a cross section illustrating an OLED display and touch-screen according to an alternative embodiment of the present invention.

The alternative arrangement of FIG. 7 includes the same first substrate 41 with first surface 11 on which are located first micro-wires 21 forming first micro-wire layer 31. The linear polarizer 16 and quarter-wave plate 14 form circular polarizer 15 and dielectric structure 10. However, in this alternative arrangement, the second micro-wires 22 of second micro-wire layer 32 are located between the linear polarizer 16 and quarter-wave plate 14 so that either the linear polarizer 16 or the quarter-wave plate 14 can provide the second surface 12 on which are located the second micro-wires 22.

Figure 6:
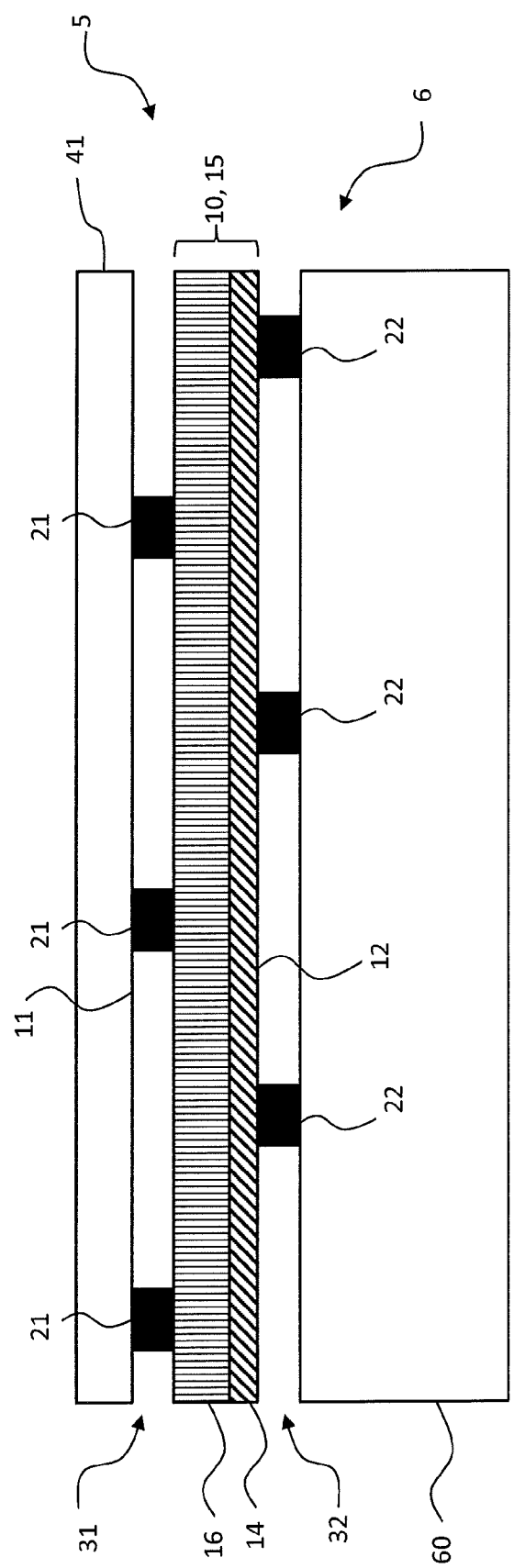
FIG. 6 is a cross section illustrating an OLED display and touch-screen according to an embodiment of the present invention.
Figure 8:
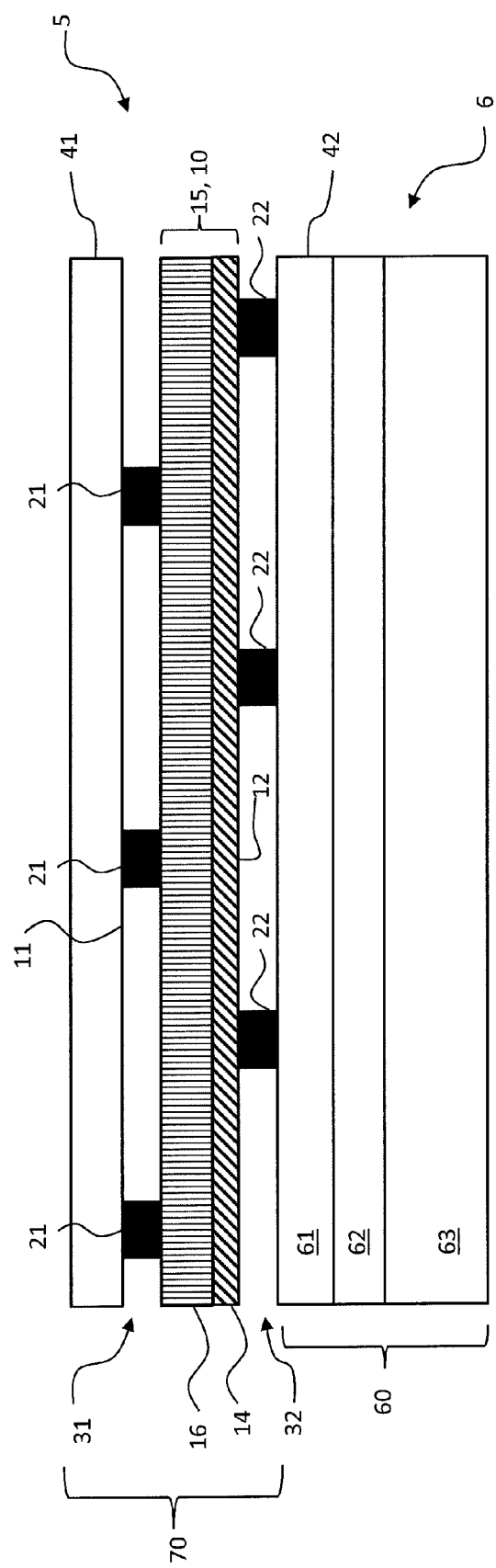
FIG. 8 is a cross section illustrating an OLED display and touch-screen according to another embodiment of the present invention.
Figure 9:
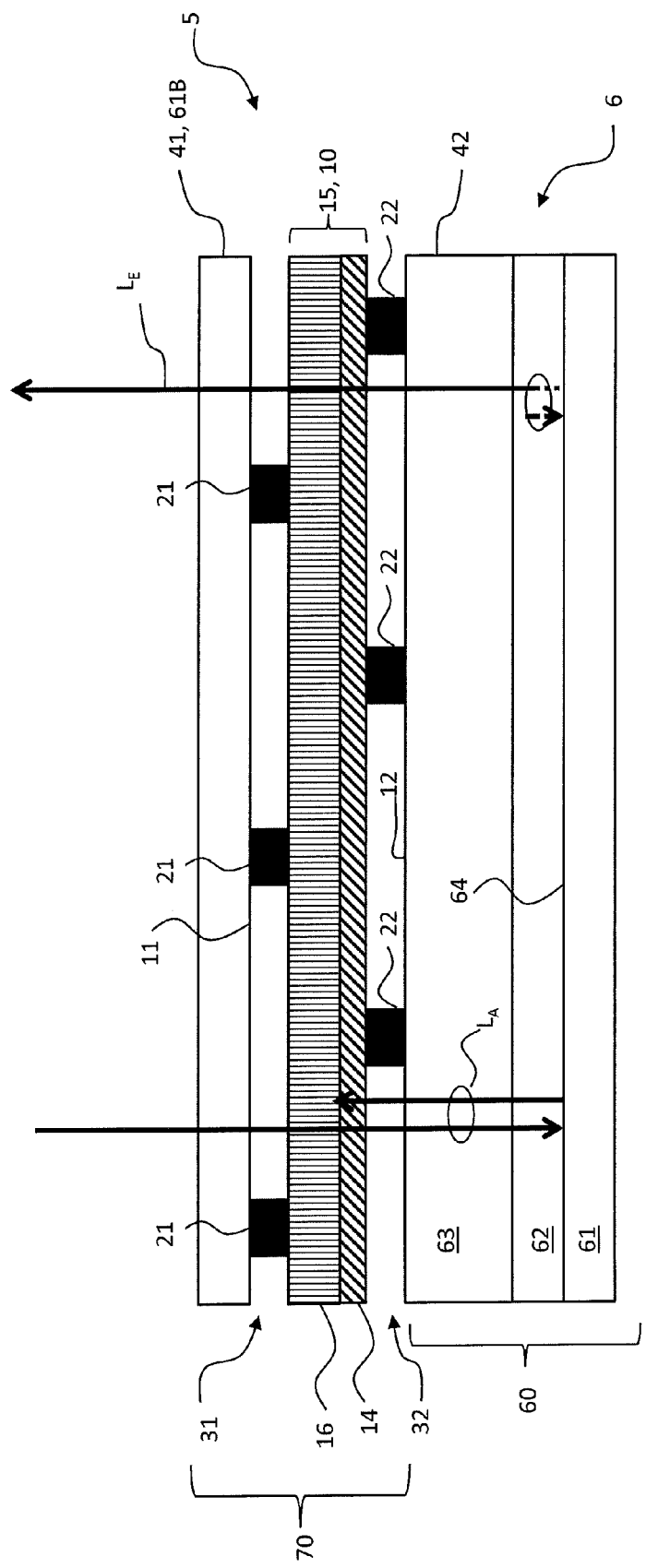
FIG. 9 is a cross section illustrating an OLED display and touch-screen and light rays according to yet another embodiment of the present invention.

Referring to FIGS. 8 and 9, in either of the arrangements of FIGS. 6 and 7, the organic light-emitting diode display 60 can include a substrate 63, one or more electronic and emissive layer 62, and a cover 61. The locations of the substrate 63 and the cover 61 can be exchanged depending on whether the organic light-emitting diode display 60 is a top-emitting display (that emits light through the cover 61 as shown in FIG. 8) or a bottom emitting display (that emits light through the substrate 63 as shown in FIG. 9). In either case, the first substrate 41 includes first surface 11 on which are located first micro-wires 21 forming a first micro-wire layer 31. The linear polarizer 16 and quarter-wave plate 14 form the circular polarizer 15 and polarizing dielectric structure 10. The second micro-wires 22 of second micro-wire layer 32 are located on an opposite side of the polarizing dielectric structure 10 from the first micro-wire layer 31. As noted above, e.g. with respect to FIGS. 1-4, in various embodiments, the micro-wire layers 31, 32 are formed on the first or second substrate 41, 42, on the polarizing dielectric structure 10, or on the linear polarizer 16, quarter-wave plate 14, or other layers on any of the structures, as desired in any preferred manufacturing process. In another embodiment, the micro-wires 22 are formed on the cover 61 (as shown in FIG. 8).

Referring further to FIG. 9, an OLED device typically includes a reflective surface 64 on one of the electrodes controlling the organic diodes so that emitted light $L_E$ is reflected through one side of the OLED device (unless an OLED display emitting light from both sides or a transparent OLED display is desired). This reflection improves the brightness of the OLED display on one side but also has the effect of reflecting ambient light $L_A$ so that the relative contrast of the OLED display with respect to ambient illumination is decreased, making it more difficult for a display observer to see the display. By employing polarizing dielectric structure 10 with a linear polarizer 16 and quarter-wave plate 14 forming a circular polarizer 15, ambient light $L_A$ incident on the OLED display is first polarized by polarizing dielectric structure 10, then rotated by quarter-wave plate 14, reflected by reflecting layer 64, and rotated again by quarter-wave plate 14. The reflected ambient light $L_A$ is then orthogonally polarized to the incident ambient light $L_A$ and absorbed by polarizing dielectric structure 10. In contrast, emitted light $L_E$, whether reflected by reflecting layer 64 or not, is rotated by the quarter-wave plate 14, polarized by the polarizing dielectric structure 10, and emitted. Since the ambient light $L_A$ is largely absorbed and the emitted light $L_E$ is not, the contrast of the OLED display is improved.

The first and second micro-wire layers 31, 32 having first micro-wires 21 are located on the first surface 11 of first substrate 41 (or on the polarizing dielectric structure 10). The first substrate 41 is useful to provide a protective layer (e.g. a cover 61B) or to form a surface on which other layers (e.g. anti-reflective layers) can be formed. Second micro-wires 22 are located on the second surface 12 of linear polarizer 16, or quarter-wave plate 14 as shown, or OLED substrate 63 and separated from the first micro-wires 21 by the polarizing dielectric structure 10 to form a touch-responsive capacitive apparatus 5. The first and second micro-wires 21, 22 can be electrically energized by a touch-screen controller (e.g. 340 in FIG. 21, not shown in FIG. 9) to form an electric field that extends through the first or second substrates 41 or 42. A conductive object (e.g. a finger) touching the first substrate 41 disturbs the electric field and the capacitance of the first and second micro-wires 21, 22. This change in capacitance is detected by the touch-screen controller. By functionally integrating the polarizing dielectric structure 10 into both the OLED display 60 and the touch screen 70 to form a touch-responsive display apparatus 6 according to an embodiment of the present invention, fewer layers are required with a consequent savings in system thickness, materials cost, and assembly cost.

Organic light-emitting diode displays and liquid crystal displays are both known in the art, as are methods for their manufacture. Various methods of forming micro-wires on surfaces are known in the art, for example by forming each first and second micro-wire layer 31, 32 separately on each of the first and second surfaces 11, 12 using lithography or printing.

In an alternative embodiment according to a method of the present invention, the polarizing dielectric structure 10 is used to enable an efficient manufacturing method for the first and second micro-wires 21, 22 of the first and second micro-wires layers 31, 32 on the first and second surfaces 11, 12. Referring to first to FIG. 10A and FIG. 12, a polarizing dielectric structure 10 is provided in step 100 that linearly polarizes incident light. First and second conductive precursor material layers 44, 46, are formed (e.g. by coating) on both the first and second sides 11, 12 of polarizing dielectric structure 10 in step 105. The first surface 11 can be coated at the same time as, before, or after the second surface 12.

Referring to FIGS. 10B and 12, the first and second conductive precursor material layers 44, 46, are then patterned in step 110 by exposing first surface 11 to first patterned light L1 and by exposing second surface 12 to second patterned light L2. The micro-wire pattern of the first micro-wires 21 can be different, or the same as, or offset from, the micro-wire pattern of the second micro-wires 22 while the electrodes themselves can be orthogonal (for example as shown with electrodes 330, 332 in FIG. 21). Patterned light is provided, for example, by shining light through a pattern mask or by pattern-wise exposing with laser light. Both the first and the second patterned light L1 and L2 are polarized orthogonally to the direction of the polarized dielectric layer 10 and are exposed from opposite directions with respect to the polarizing dielectric substrate 10. Thus, the first patterned light L1 exposes only the first conductive precursor material layer 44 and does not pass through the polarizing dielectric substrate 10 to expose the second conductive precursor material layer 46. Similarly, the second patterned light L2 exposes only the second conductive precursor material layer 46 and does not pass through the polarizing dielectric substrate 10 to expose the first conductive precursor material layer 44.

Figure 10C:
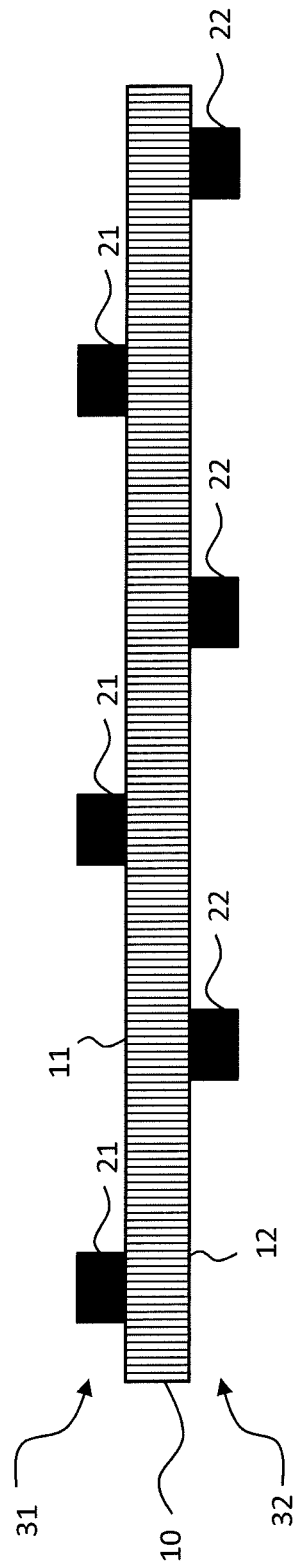

Referring next to FIGS. 10C and 12, the first and second conductive precursor material layers 44, 46 (not shown) are processed in step 115, for example by curing the exposed first and second conductive precursor material layers 44, 46 to harden exposed or unexposed portions and form conductive first and second micro-wires (e.g. 21, 22) in first and second micro-wire layers 31, 32 on the polarizing dielectric structure 10, and washing away the undesired portions. Either positive- or negative-acting processes can be used. The first and second conductive precursor material layers 44, 46 are conductive precursor materials because the materials can change their nature (in particular their electrical conductivity) after curing and subsequent to coating to form the conductive first and second micro-wires 21, 22. A variety of materials can be employed to form the patterned layer, including resins that can be cured by cross-linking wave-length-sensitive polymeric binders and silver halide materials that are exposed to light. Silver nano-particles that can be sintered to form conductive traces can also be used. Processing can include both washing out residual uncured materials and curing or exposure steps.

The first and second conductive precursor material layers 44, 46 can be coated at the same time or at different times. Likewise, the first and second conductive precursor material layers 44, 46 can be exposed by first and second patterned light L1, L2, respectively, at the same time or different times. Similarly, the exposed first and second conductive precursor material layers 44, 46 can be processed at the same or different times. These separate steps can be performed together or separately even if the first and second surfaces 11, 12 are on the same substrate (e.g. polarizing dielectric structure 10) or different substrates (e.g. cover 61, substrate 63).

In an embodiment, the first and second micro-wire layers 31, 32 are carefully aligned to enable an effective and consistent detection of an efficiently produced electrical field by energized first and second micro-wires 21, 22. If the first and second conductive precursor material layers 44, 46 are exposed at different times and in different locations in a manufacturing process, it is difficult to provide tight tolerances, especially at the micron scale (or smaller) needed to render the micro-wires invisible to unaided human observers. By exposing the first and second conductive precursor material layers 44, 46 to first and second patterned light L1 and L2 at the same time and in the same location, better alignment between the two patterns can be achieved.

Figure 11A:
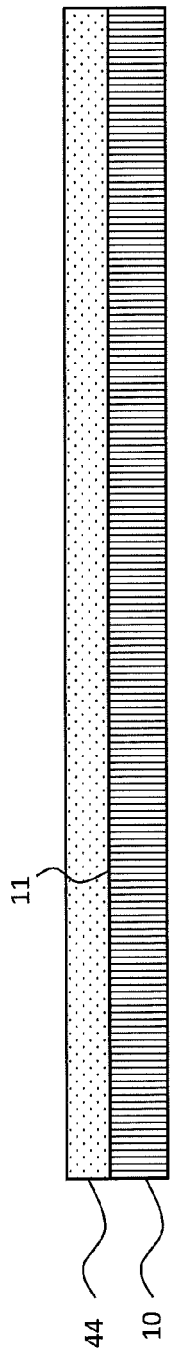
FIGS. 11A-11F are sequential cross sections illustrating another method of the present invention.
Figure 11B:
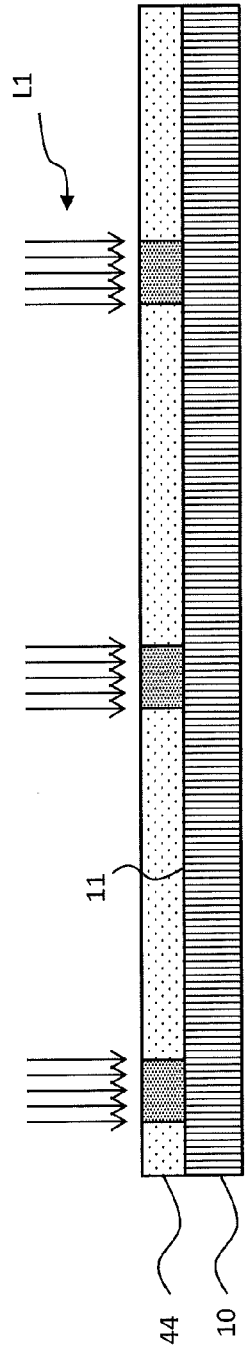
Figure 11C:
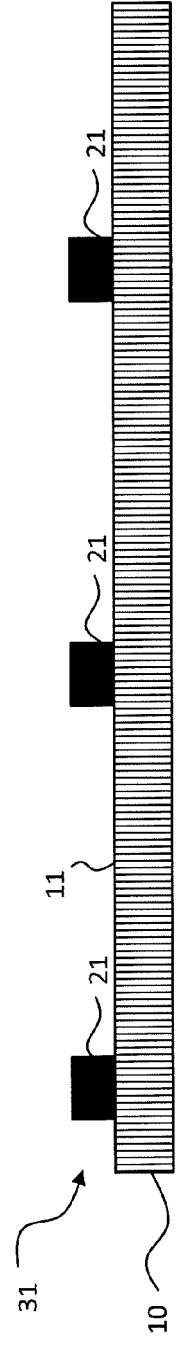
Figure 11D:
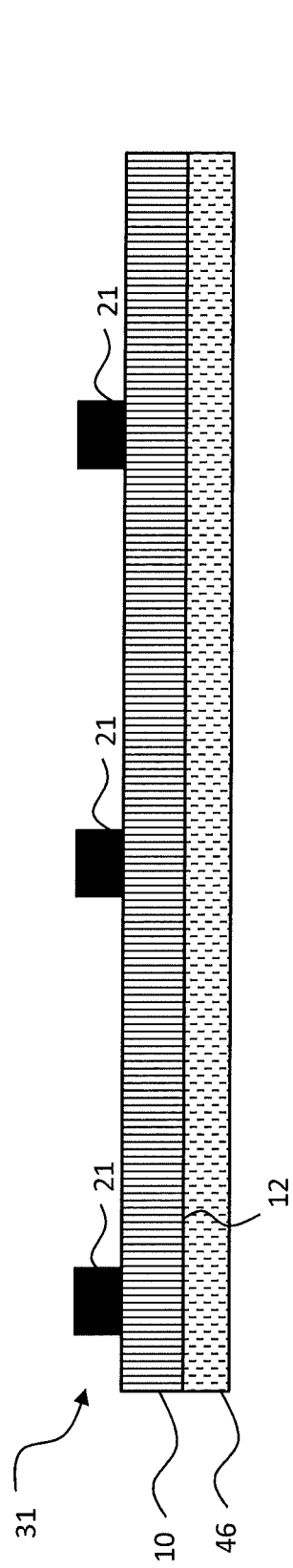
Figure 11E:
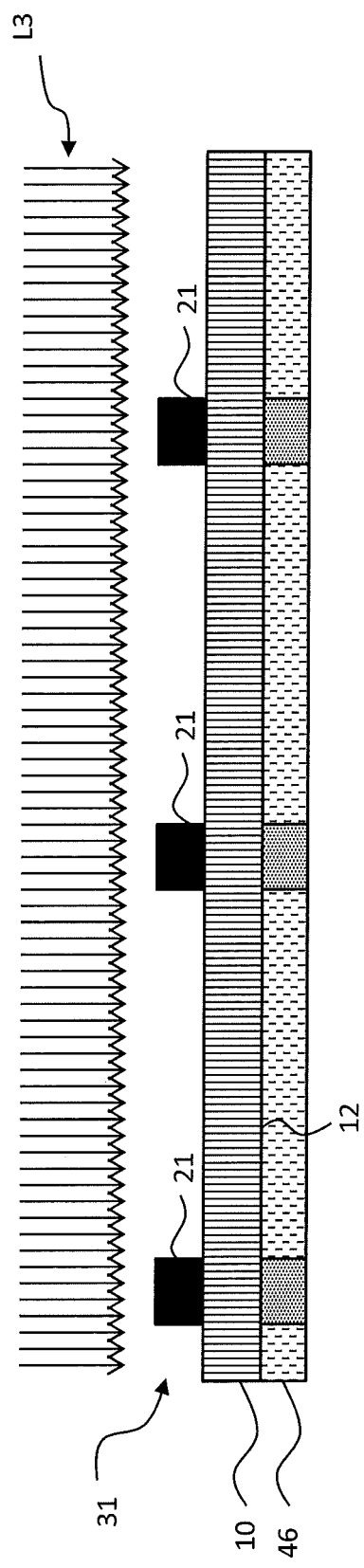

Referring to FIGS. 11A-11F and to FIG. 13, in an alternative method of the present invention, alignment between the first and second micro-wire layers 31, 32 in overlapping portions of first and second micro-wire layers 31, 32 is achieved with separate exposures by using the first micro-wire layer 31 as a mask to expose the second micro-wire layer 32 in the overlapped area. In a first step 100 a polarizing dielectric structure 10 is provided that linearly polarizes incident light. The first surface 11 of the polarizing dielectric structure 10 is coated with a first conductive precursor material layer 44 in step 120 as shown in FIG. 11A. First patterned light L1 exposes the first conductive precursor material layer 44 on the first surface 11 of the polarizing dielectric structure 10 in step 125 as shown in FIG. 11B. The first patterned light L1 can be polarized but need not be, since the second conductive precursor material layer 46 is not present on the second surface 12 of the polarizing dielectric structure 10. Referring to FIG. 11C, the first patterned conductive precursor material layer 44 is processed in step 130 to form the first micro-wires 21 in the first micro-wire layer 31 on the first surface 11 of the polarizing dielectric structure 10. Referring to FIG. 11D, the second surface 12 of the polarizing dielectric structure 10 is coated with a second conductive precursor material layer 46 in step 135. Referring to FIG. 11E, a blanket exposure of unpatterned light L3 is directed through the polarizing dielectric structure 10 from the side of the polarizing dielectric structure 10 having the first micro-wires 21 forming the first micro-wire layer 31 to expose the second conductive precursor material layer 46 in step 140. The second conductive precursor material layer 46 is thus pattern-wise exposed since the first micro-wires 21 forming the first micro-wire layer 31 prevent light passing through the polarizing dielectric structure 10 to the second conductive precursor material layer 46. The second conductive precursor material layer 46 forms second micro-wires 22 where it is not exposed. (The first conductive precursor material layer 44 can use either positive-acting materials (as shown) or negative-acting materials.) In step 145, referring to FIG. 11F, the second patterned conductive precursor material layer 46 is processed in step 145 to form the second micro-wires 22 in the second micro-wire layer 32 on the second surface 12 of the polarizing dielectric structure 10. Second micro-wires 22 in the non-overlapped area can be formed using the processes described above.

Figure 18:
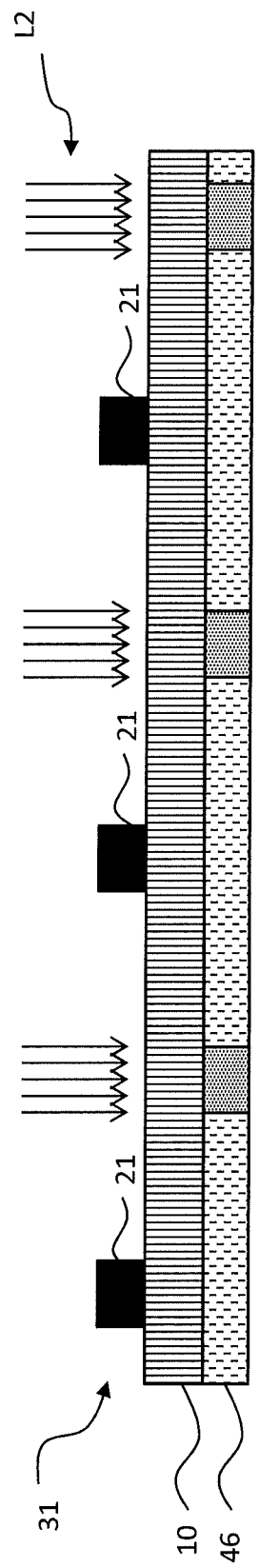
FIG. 18 is a cross section illustrating an alternative step in a method according to an embodiment of the present invention.

In the alternative embodiment of FIG. 18, the blanket exposure of unpatterned light is replaced with a patterned positive-acting light L2 having a polarization matching that of the polarizing dielectric structure 10 directed through the polarizing dielectric structure 10 from the side of the polarizing dielectric structure 10 having the first micro-wires 21 forming the first micro-wire layer 31 to expose the second conductive precursor material layer 46 in areas not occluded by the first micro-wires 21 in step 140. The second conductive precursor material layer 46 is thus pattern-wise exposed in a pattern different from the pattern used to expose the first conductive precursor material layer 44. Thus, the second micro-wire layer 32 can have a pattern different from the first micro-wire layer 31.

Figure 11F:
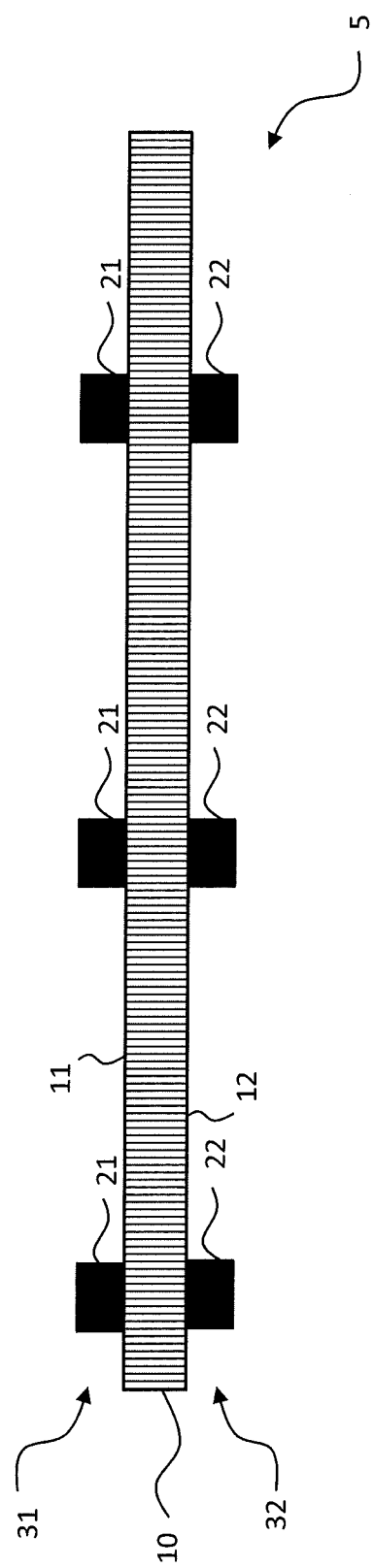
Figure 14:
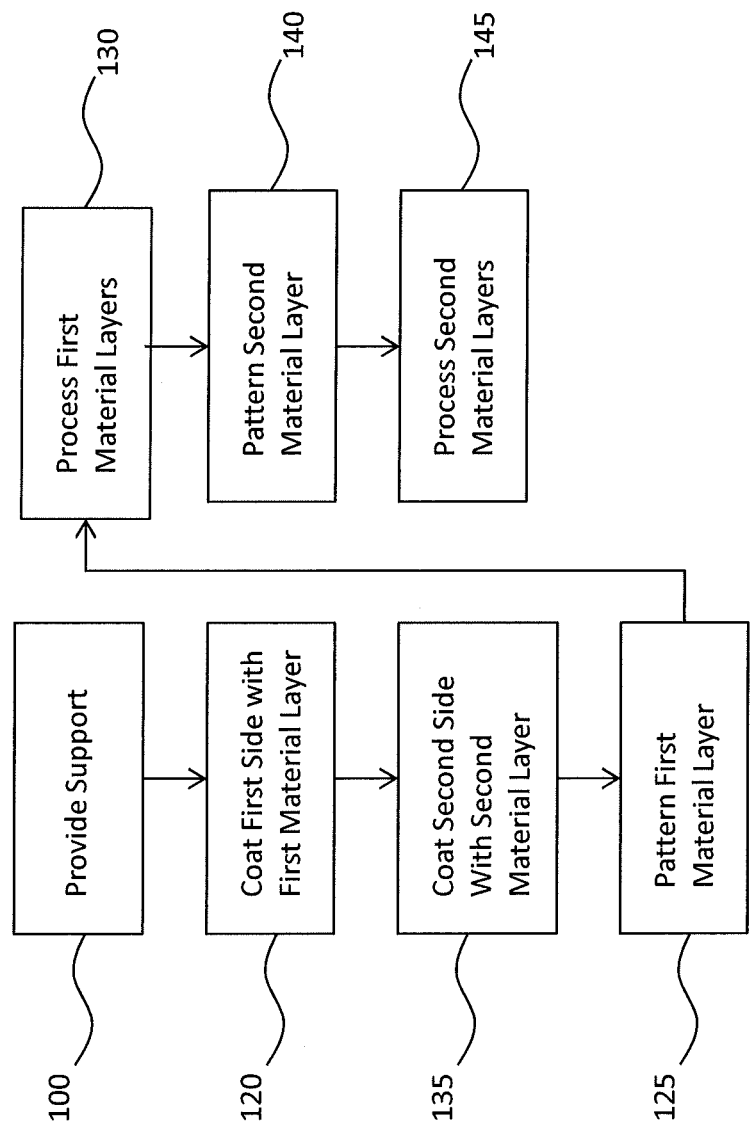
FIG. 14 is a flow diagram illustrating an alternative method of the present invention.

In an alternative method illustrated in FIG. 14, polarizing dielectric structure 10 is provided in step 100. The first and second conductive precursor material layers 44, 46 are both coated on the polarizing dielectric structure 10 before either side is exposed in steps 125, 140, respectively. Polarized and first patterned light L1 is then used to expose the first conductive precursor material layer 44 in step 125 without exposing the second conductive precursor material layer 46 by using light having orthogonal polarization as the polarizing dielectric structure 10. The first conductive precursor material layer 44 is then processed in step 130. The second conductive precursor material layer is then exposed in step 140 and processed in step 145 as also shown in FIG. 13 and FIGS. 11E and 11F.

In a further embodiment, the second conductive precursor material layers 46 respond to different frequencies or types of light than the first conductive precursor material layer 44. In this embodiment, first conductive precursor material layer 44 is exposed with a first type of light that does not affect the second conductive precursor material layer 46. For example, first conductive precursor material layer 44 can be sensitive to UV light whereas second conductive precursor material layer 46 can be sensitive to both UV and red light. When the first conductive precursor material layer 44 is exposed to patterned UV light, the light is polarized orthogonally to the polarizing dielectric structure 10. In this way UV light does not pass through and expose second conductive precursor material layer 46. The second conductive precursor material layer 46 can be pattern-exposed to red light from either side. If exposed through the polarizing dielectric structure 10, at least some of the red light needs to have a polarization orientation parallel to polarizing dielectric structure 10. The first and second conductive precursor material layers 44, 46 are then processed.

Figure 15:
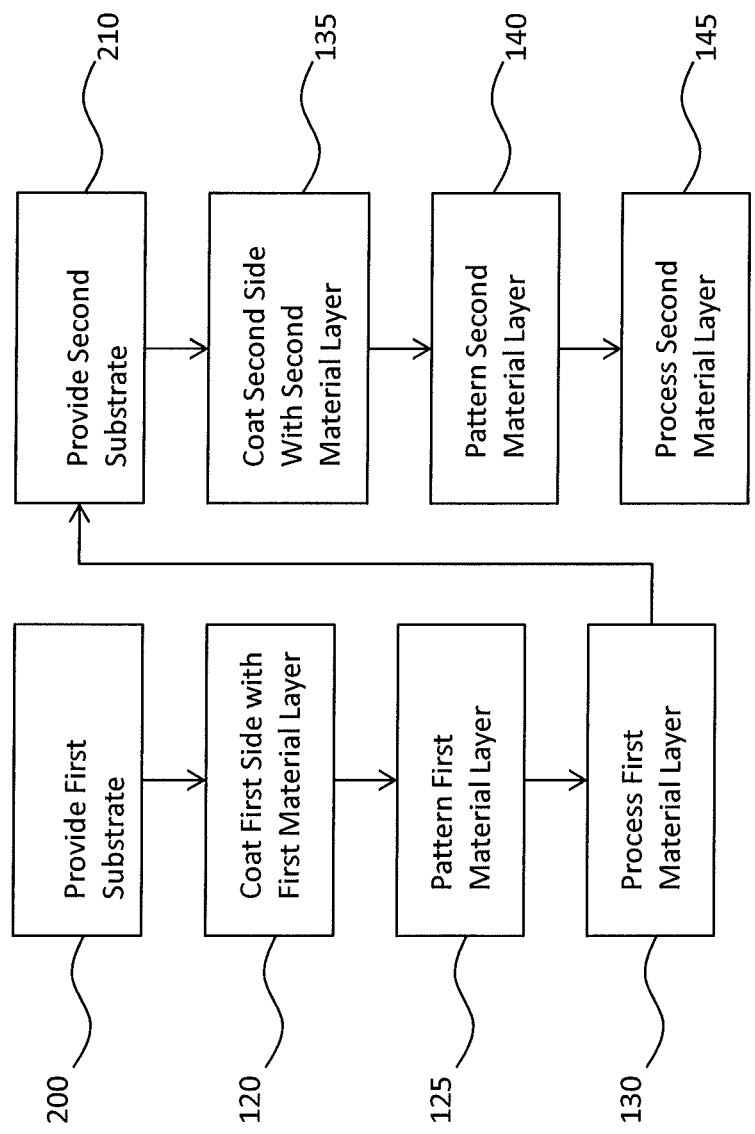
FIG. 15 is a flow diagram illustrating yet another method of the present invention.

In yet another embodiment of the present invention, first and second micro-wire layers 31, 32 are made separately on separate substrates or supports. Referring to FIG. 15, a first substrate 41 is first provided in step 200. The first surface 11 of the first substrate 41 is coated with a first conductive precursor material layer 44 in step 120. The first conductive precursor material layer 44 is patterned in step 125 (for example by exposing the first conductive precursor material layer 44 to patterned radiation) and processed in step 130. A second substrate 42 is then provided in step 210. The second side 12 of the second substrate 42 is coated with a second conductive precursor material layer 46 in step 135. The second conductive precursor material layer 46 is patterned in step 140 (for example by exposing the first conductive precursor material layer 46 to patterned radiation) and processed in step 145.

Figure 16:
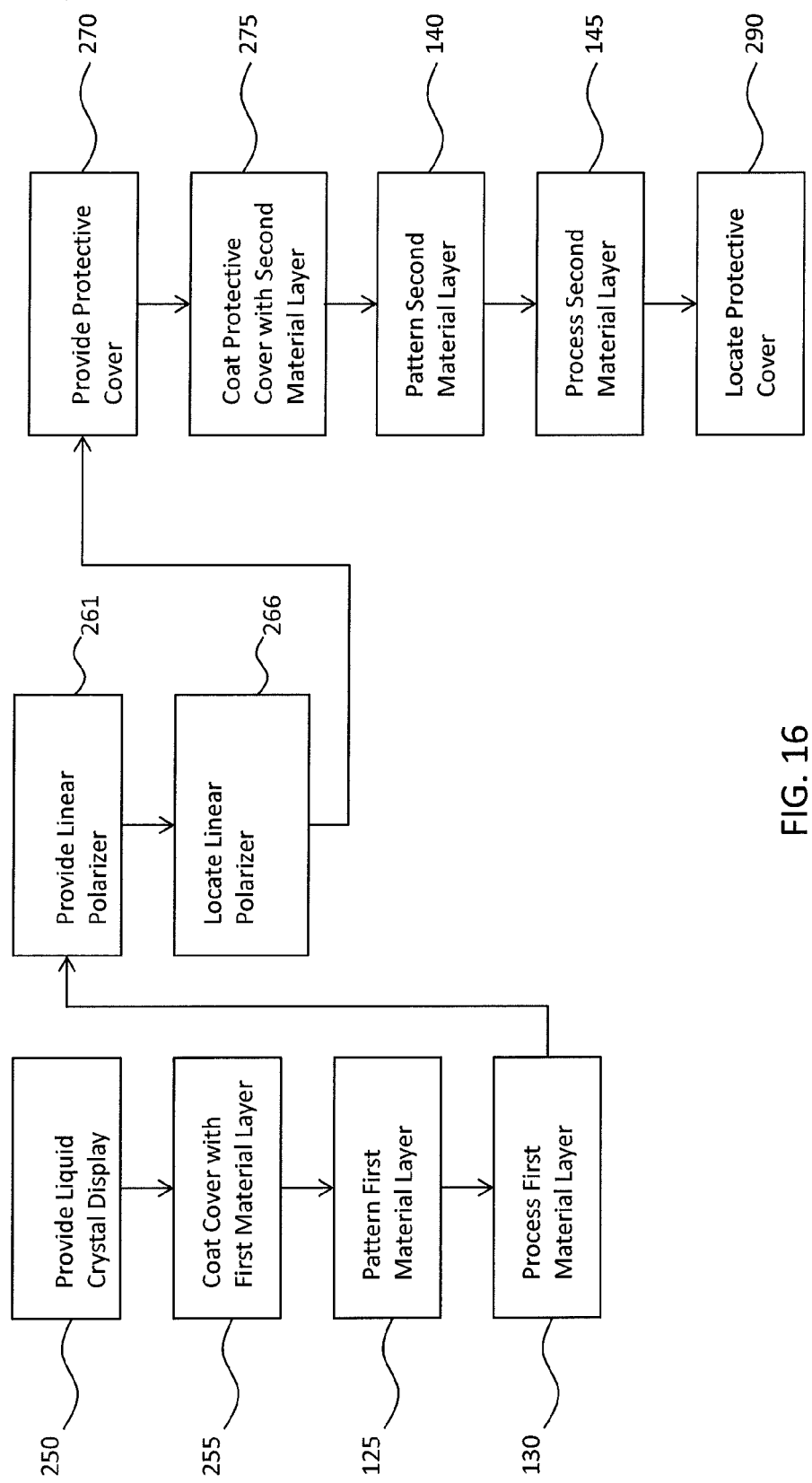
FIG. 16 is a flow diagram illustrating a method of the present invention.

According to an embodiment of the present invention, the first and second micro-wire layers 31, 32 of the touch-responsive capacitive apparatus 5 of the present invention is integrated with a display, as illustrated in FIGS. 5-9. Referring to FIGS. 16 and 5 in one embodiment, a liquid crystal display 50 is provided in step 250. The cover 61 of the liquid crystal display 50 is also the first substrate 41 and is coated with the first conductive precursor material layer 44 on first surface 11 in step 255, patterned in step 125, for example with patterned radiation, and processed in step 130 to form first micro-wires 21 in first micro-wire layer 31. A polarizing dielectric structure 10 is provided as a linear polarizer in step 261 and located over the processed first material layer in step 266. A second substrate 42 (serving as a protective cover for the liquid crystal layer) is then provided in step 270, coated with the second conductive precursor material layer 46 on second surface 12 in step 275, patterned in step 140, for example with patterned radiation, and processed in step 145 to form second micro-wires 22 in second micro-wire layer 32. The protective cover is located over the polarizing dielectric structure 10 in step 290 to form a touch screen 70 for a touch-responsive capacitive apparatus 5 in an integrated touch-responsive display apparatus 6. In alternative embodiments, one or both of the first and second conductive material precursor layers 44, 46 are coated on the polarizing dielectric structure 10, for example as described with respect to FIG. 1, rather than on the display cover 61 or second substrate 42. The first and second micro-wires 21, 22 can be formed on a substrate of the LCD display 50 or other display before the substrates are incorporated into a complete display device.

Figure 17:
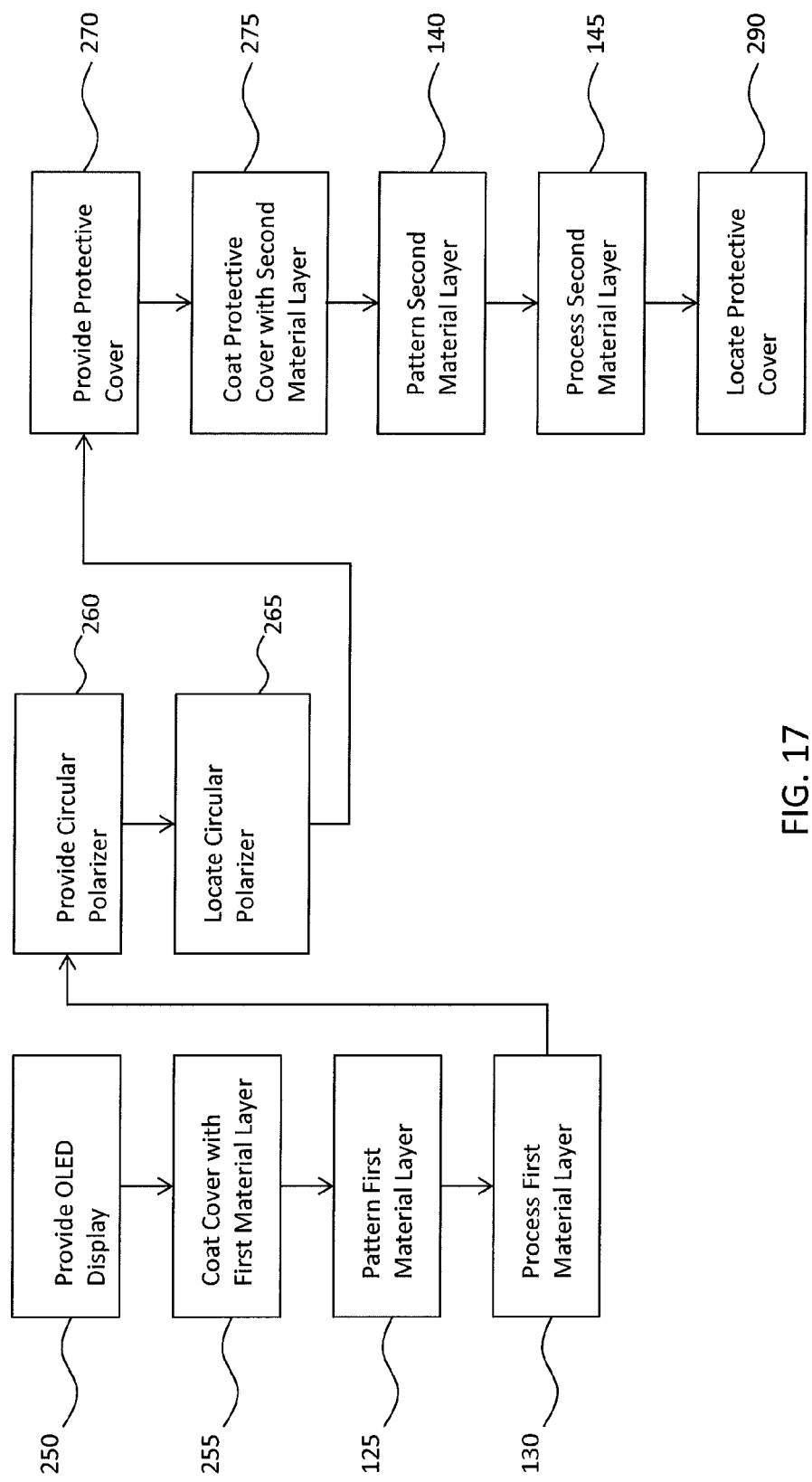
FIG. 17 is a flow diagram illustrating another method of the present invention.

According to another embodiment of the present invention, the first and second micro-wire layers 31, 32 of the touch-responsive capacitive apparatus 5 of the present invention is integrated with an OLED display 60, as illustrated in FIGS. 8 and 17. An OLED display 60 is provided in step 250. The cover 61 of the OLED display 60 is also the first substrate 41 and is coated with the first conductive precursor material layer 44 (not shown on FIG. 8) on first surface 11 in step 255, patterned in step 125, for example with patterned radiation, and processed in step 130 to form first micro-wires 21 in first micro-wire layer 31. A circular polarizer including a quarter-wave plate 14 and polarizing dielectric structure 10 is provided in step 260 and located over the processed first material layer in step 265. A second substrate 42 (serving as a protective cover) is then provided in step 270, coated with the second conductive precursor material layer 46 (not shown on FIG. 8) on second surface 12 in step 275, patterned in step 140, for example with patterned radiation, and processed in step 145 to form second micro-wires 22 in second micro-wire layer 32. The protective cover is located over the polarizing dielectric structure 10 in step 290 to form a touch screen 70 for a touch-responsive capacitive apparatus 5 in an integrated touch-responsive display apparatus 6. In alternative embodiments, one or both of the first and second material precursor layers 44, 46 (not shown in FIG. 8) are coated on the circular polarizer 15, for example as described with respect to FIGS. 6 and 7, rather than on the display cover 61 or second substrate 41.

In other embodiments of the present invention, other layers or substrates are located between the first and second micro-wire layers 31, 32.

In other embodiments of the present invention, the first micro-wire layer 31 can form a first electrically conductive mesh of first micro-wires 21. Likewise, the second micro-wire layer 32 can form a second electrically conductive mesh of second micro-wires 22. The first mesh can be aligned or offset with respect to the second mesh.

The first or second conductive precursor material layers 44, 46 can include a variety of materials. For example suitable materials include spectrally sensitive materials that can be exposed to patterned radiation to form first and second micro-wires 21, 22. Alternatively, first or second conductive precursor materials 44, 46 can be pattern-wise deposited, for example in a liquid form by an inkjet device, and then cured to form micro-wires.

A variety of processing methods can be used, for example photo-lithographic or silver halide methods. In an embodiment, the conductive precursor material layer includes conductive ink, conductive particles, or metal ink. The exposed portions of the layers can be cured to form the first and second micro-wires 21, 22 (for example by exposure to patterned laser light to cross-link a curable resin) and the uncured portions removed. Alternatively, unexposed portions of the first and second micro-wire layers 31, 32 can be cured to form the first and second micro-wires 21, 22 and the cured portions removed. Materials can be deposited using inkjet deposition equipment. In other embodiments, other printing methods can be used to directly pattern the first and second micro-wire layers 31, 32, for example including patterned inkjet deposition, flexographic printing, gravure printing, electro-photographic printing, or micro-contact printing. Other methods known in the printing art for forming micro-wires can be employed.

In another embodiment of the present invention, the first and second conductive precursor material layers 44, 46 are silver salt layers. The silver salt can be any material that is capable of providing a latent image (that is, a germ or nucleus of metal in each exposed grain of metal salt) according to a desired pattern upon photo-exposure. The latent image can then be developed into a metal image.

For example, the silver salt can be a spectrally photosensitive silver salt such as a silver halide or mixture of silver halides. The silver halide can be, for example, silver chloride, silver bromide, silver chlorobromide, or silver bromoiodide.

Generally, the silver salt layer includes one or more hydrophilic binders or colloids. Non-limiting examples of such hydrophilic binders or colloids include but are not limited to hydrophilic colloids such as gelatin or gelatin derivatives, polyvinyl alcohol (PVA), polyvinylpyrrolidone (PVP), casein, and mixtures thereof.

In many embodiments, the binder in the silver salt layer (or any other layer) includes one or more hardeners designed to harden the particular binder such as gelatin. Particularly useful hardeners include, but are not limited to, non-polymeric vinyl-sulfones such as bis(vinyl-sulfonyl) methane (BVSM), bis(vinyl-sulfonyl methyl)ether (BVSME), and 1,2-bis(vinyl-sulfonyl acetoamide)ethane (BVSAE). Mixtures of hardeners can be used if desired.

One useful photosensitive silver salt composition is a high-metal (for example, silver)/low-binder (for example, gelatin) composition, that after silver salt development, is sufficiently conductive. Where the photosensitive silver salt layer includes an emulsion of silver halide dispersed in gelatin, a particularly useful weight ratio of silver to gelatin is 1.5:1 or higher in the silver salt layer. In certain embodiments, a ratio between 2:1 and 3:1 in the silver salt layer is particularly useful.

According to many embodiments, the useful silver salt is a silver halide (AgX) that is sensitized to any suitable wavelength of exposing radiation. Organic sensitizing dyes can be used to sensitize the silver salt to visible or IR radiation, but it can be advantageous to sensitize the silver salt in the UV portion of the electromagnetic spectrum without using sensitizing dyes.

Processing of AgX materials to form conductive traces typically involves at least developing exposed AgX and fixing (removing) unexposed AgX. Other steps can be employed to enhance conductivity, such as thermal treatments, electroless plating, physical development and various conductivity enhancing baths, e.g., as described in U.S. Pat. No. 3,223,525.

The conductive precursor materials can be liquid (for example a conductive, curable ink) and can be blanket coated in one step and pattern-wise cured by pattern-wise exposing the blanket coating in the pad and interstitial areas.

In an embodiment, the first and second conductive precursor material layers 44, 46 can each include a metallic particulate material or a metallic conductive precursor material, and a photosensitive binder material.

In any of these cases, the conductive precursor material is conductive after it is cured and any needed processing completed. Before patterning or before curing, the conductive precursor material is not necessarily electrically conductive. As used herein, conductive precursor material is material that is electrically conductive after any final processing is completed and the conductive precursor material is not necessarily conductive at any other point in the micro-wire formation process.

Micro-wires of the present invention are electrically conductive after all processing is completed. The micro-wires can be in a layer, with or without a binder. The binder can be electrically conductive or insulating.

To achieve transparency, the total area occupied by the first micro-wires 21 is less than 15% of the first transparent conductor area and the total area occupied by the second micro-wires 22 is less than 15% of the second transparent conductor area. Any of the substrates can be largely transparent, for example having greater than 80% transmittance to light at 550 nm. The first and second micro-wires 21, 22 can have a width greater than or equal to 0.5 um and less than or equal to 20 um. The first and second metallic micro-wires 21, 22 can occupy an area less than 15% of the first and second micro-wire layers 31, 32, respectively. As noted above, in an embodiment in which a substrate is a polarizer, for example a linear polarizer, the substrate can have a transparency of 30% to 50%, or more particularly from 38% to 45%.

The invention has been described in detail with particular reference to certain embodiments thereof, but it will be understood that variations and modifications can be effected within the spirit and scope of the invention.

PARTS LIST

L light
L1 first patterned light
L2 second patterned light
L3 unpatterned light
$L_A$ ambient light
$L_E$ emitted light
5 touch-responsive capacitive apparatus
6 touch-responsive display apparatus
10 polarizing dielectric structure
11 first surface
12 second surface
14 quarter-wave plate
15 circular polarizer
16 linear polarizer
21 first micro-wire
22 second micro-wire
23 conductive material
24 light-absorbing layer
25 transparent material
31 first micro-wire layer
32 second micro-wire layer
41 first substrate
42 second substrate
44 first conductive precursor material layer
46 second conductive precursor material layer
50 LCD display
51 liquid crystal layer
52 polarizer layer
53 backlight
54 electronic and electrode layer
60 OLED display
61, 61A, 61B cover
62 electronic and emissive layers
63 substrate
64 reflective surface
70 touch-screen
100 provide structure step
105 coat sides with material layers step
110 pattern material layers step 115 process material layers step
120 coat first side with first material layer step
125 pattern first material layer step
130 process first material layer step
135 coat second side with second material layer step
140 pattern second material layer step
145 process second material layer step
200 provide first substrate
210 provide second substrate
250 provide OLED display step
255 coat cover with first material layer step
260 provide circular polarizer step
261 provide linear polarizer step
265 locate circular polarizer step
266 locate linear polarizer step
270 provide protective cover step
275 coat protective cover with second material layer step
290 locate protective cover step
300 touch screen and display system
310 display
322 first transparent substrate
324 dielectric layer
326 second transparent substrate
328 first pad area
329 second pad area
330 first transparent electrode
332 second transparent electrode
334 wires
336 buss connections
340 touch screen controller
342 display controller
350 micro-wires
356 micro-pattern

The invention claimed is:

1. A method of making a touch-responsive capacitive apparatus, comprising:
providing a polarizing dielectric structure having a first surface and a second surface opposed to the first surface, a first conductive precursor material layer on the first surface, and a second conductive precursor material layer on the second surface;
exposing the first conductive precursor material layer with first patterned polarized light, the first patterned polarized light having an orientation that is absorbed by the polarizing dielectric substrate so that the second conductive precursor material layer is not exposed;
exposing the second conductive precursor material layer with second patterned polarized light, the second patterned polarized light having an orientation that is absorbed by the polarizing dielectric substrate so that the first conductive precursor material layer is not exposed;
processing the exposed first conductive precursor material layer to form a first conductive material pattern on the first surface; and
processing the exposed second conductive precursor material layer to form a second conductive material pattern on the second surface.

2. The method according to claim 1, wherein the providing step includes receiving or forming the polarizing dielectric structure and forming the first conductive precursor material layer on the first surface and the second conductive precursor material layer on the second surface.

3. The method according to claim 1, wherein the providing step includes receiving the polarizing dielectric structure with the first conductive precursor material layer on the first surface and the second conductive precursor material layer on the second surface.

4. The method according to claim 1, wherein the first conductive material pattern forms a first conductive mesh of first micro-wires.

5. The method according to claim 1, wherein the second conductive material pattern forms a second conductive mesh of second micro-wires.

6. The method according to claim 1, wherein the polarizing dielectric structure is a linearly polarizing dielectric structure.

7. The method according to claim 6, wherein the first patterned polarized light is orthogonally oriented to the linearly polarizing dielectric structure.

8. The method according to claim 6, wherein the second conductive precursor material layer with second patterned polarized light is orthogonally oriented to the linearly polarizing dielectric structure.

9. The method according to claim 1, substrate wherein the polarizing dielectric structure is a linearly polarizing dielectric substrate having the first and second surfaces.

10. The method according to claim 1, including providing a first substrate having the first surface, providing a second substrate having the second surface, and locating a linearly polarizing dielectric substrate between the first substrate and the second substrate.

11. The method according to claim 1, including providing a linearly polarizing dielectric substrate having the first surface and providing a second substrate having the second surface.

12. The method according to claim 1 wherein either of the first or second conductive precursor material layers includes a photosensitive conductive precursor material provided in a binder material.

13. The method according to claim 12 wherein the photosensitive conductive precursor material includes a silver halide and the binder material includes a gelatin.

14. The method according to claim 12 wherein the photosensitive conductive precursor material is a conductive ink.

15. The method according to claim 1 wherein the first or second conductive precursor material layers each include a metallic particulate material or a metallic conductive precursor material, and a photosensitive binder material.

16. The method according to claim 15, wherein processing the exposed first and second precursor material layers includes curing the exposed portions of the first and second conductive precursor material layers and removing the uncured portions to form the first or second micro-wires.

17. The method according to claim 1, wherein the first conductive precursor material layer is pattern-wise exposed in a first step and the second conductive precursor material layer is pattern-wise exposed in a second step different from the first step.

18. The method according to claim 1, wherein the first conductive precursor material layer and the second conductive precursor material layer are pattern-wise exposed in a common step.

19. The method according to claim 1, wherein the exposed first conductive precursor material layer and the exposed second conductive precursor material layer are processed in a common step.

20. A method of making a touch-responsive capacitive apparatus, comprising:
providing a polarizing dielectric structure having a first surface and a second surface opposed to the first surface, a first conductive precursor material layer on the first surface, and a second conductive precursor material layer on the second surface;
exposing the first conductive precursor material layer with first patterned polarized light, the first patterned polarized light having an orientation that is absorbed by the polarizing dielectric substrate so that the second conductive precursor material layer is not exposed;

processing the exposed first conductive precursor material layer to form a first material pattern on the first surface;

exposing the second conductive precursor material layer through the polarizing dielectric structure with second patterned light, the second patterned light having an orientation that is at least partially transmitted by the polarizing dielectric substrate so that the second conductive precursor material layer is exposed; and processing the exposed second conductive precursor material layer to form a second material pattern on the second surface.

* * * * *